United States Patent
Ji et al.

(10) Patent No.: US 8,289,891 B2
(45) Date of Patent: Oct. 16, 2012

(54) FLEXIBLE SLEEP MODE FOR ADVANCED WIRELESS SYSTEMS

(75) Inventors: Baowei Ji, Plano, TX (US); Changhoi Koo, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 697 days.

(21) Appl. No.: 12/381,913

(22) Filed: Mar. 18, 2009

(65) Prior Publication Data

US 2009/0279466 A1  Nov. 12, 2009

Related U.S. Application Data

(60) Provisional application No. 61/071,650, filed on May 9, 2008, provisional application No. 61/133,795, filed on Jul. 2, 2008, provisional application No. 61/133,796, filed on Jul. 2, 2008.

(51) Int. Cl.
*G08C 17/00* (2006.01)
(52) U.S. Cl. ....................................... 370/311
(58) Field of Classification Search ................ None
See application file for complete search history.

(56) References Cited

U.S. PATENT DOCUMENTS

| | | | |
|---|---|---|---|
| 6,073,035 A | 6/2000 | Witter | |
| 7,061,428 B1 | 6/2006 | Amier et al. | |
| 8,185,726 B2 * | 5/2012 | Taha et al. | 370/328 |
| 2008/0170526 A1 * | 7/2008 | Narang et al. | 370/311 |
| 2008/0214249 A1 * | 9/2008 | Kim et al. | 455/574 |
| 2009/0040955 A1 * | 2/2009 | Jung et al. | 370/311 |
| 2009/0238098 A1 * | 9/2009 | Cai et al. | 370/254 |
| 2009/0279467 A1 * | 11/2009 | Ji | 370/311 |
| 2010/0255835 A1 * | 10/2010 | Suzuki et al. | 455/425 |
| 2011/0195697 A1 * | 8/2011 | Kim et al. | 455/418 |

OTHER PUBLICATIONS

International Search Report dated Feb. 24, 2010 in connection with PCT Application No. PCT/KR2009/003623.

\* cited by examiner

*Primary Examiner* — Anh-Vu Ly

(57) ABSTRACT

A base station capable of wireless communication with a plurality of subscriber stations within a coverage area of a network, where the base station is capable of transmitting, to a subscriber station, a traffic indication message with an indicator value, wherein the indicator value is used by both the base station and the subscriber station to dynamically adjust the length of the next discontinuous reception (DRX) cycle in an absence of an explicit signaling message from the base station.

47 Claims, 25 Drawing Sheets

FLEXIBLE SLEEP MODE FOR ADVANCED WIRELESS SYSTEMS

CROSS-REFERENCE TO RELATED APPLICATION(S) AND CLAIM OF PRIORITY

The present application is related to U.S. Non-provisional patent application Ser. No. 12/381,967, entitled "ADAPTIVE AND EFFECTIVE POWER SAVING DESIGN" filed concurrently herewith, and which is hereby incorporated by reference into the present application as if fully set forth herein.

The present application also is related to U.S. Provisional Patent No. 61/071,650, filed May 9, 2008, entitled "ADAPTIVE AND EFFECTIVE POWER SAVING DESIGN". Provisional Patent No. 61/071,650 is assigned to the assignee of the present application and is hereby incorporated by reference into the present application as if fully set forth herein.

The present application is further related to U.S. Provisional Patent No. 61/133,795, filed Jul. 2, 2008, entitled "LOW OVERHEAD SLEEP MODE FOR ADVANCED WIRELESS SYSTEMS". Provisional Patent No. 61/133,795 is assigned to the assignee of the present application and is hereby incorporated by reference into the present application as if fully set forth herein. The present application hereby claims priority under 35 U.S.C. §119(e) to U.S. Provisional Patent No. 61/133,795.

The present application is yet further related to U.S. Provisional Patent No. 61/133,796, filed Jul. 2, 2008, entitled "FLEXIBLE SLEEP MODE FOR ADVANCED WIRELESS SYSTEMS". Provisional Patent No. 61/133,796 is assigned to the assignee of the present application and is hereby incorporated by reference into the present application as if fully set forth herein. The present application hereby claims priority under 35 U.S.C. §119(e) to U.S. Provisional Patent No. 61/133,796.

TECHNICAL FIELD OF THE INVENTION

The present application relates generally to power management and, more specifically, to a system and method for reducing power consumption in wireless networks.

BACKGROUND OF THE INVENTION

Electronic communication devices require power in order to operate. In many cases, these electronic communication devices are deployed in the form of a mobile device, such as a mobile station (MS), with a battery having a limited capacity. In order to extend the operation time of a wireless device, the electronic communication device may enter a reduced power mode, sometimes referred to as a sleep mode, a.k.a., discontinuous reception (DRX). This sleep mode is designed to reduce the power consumption of the electronic communication device while the electronic communication device is not active. The reduction of the electronic communication power consumption through a sleep mode extends the life of the battery and reduces the amount of heat produced by the device without disabling the device.

To this end, three power saving schemes are defined for sleep mode in the IEEE 802.16e standard power saving class (PSC). PSC type I is for connections of best efforts (BE) and non-real-time variable rate (NRT-VR) type application. PSC type II is for connections of unsolicited grant service (UGS) and real-time variable rate (RT-VR) type applications. PSC type III is for multicast connections as well as for management operations.

With PSC type I, sleep windows (or sleep intervals) are interleaved with listening windows (or listening intervals) of a fixed duration. If there is no traffic as indicated by a traffic indication message, such as an MOB_TRF_IND(0) message, the sleep interval in the next discontinuous reception (DRX) cycle doubles until the sleep interval reaches a predetermined upper limit. If the Traffic_triggered_wakening_flag (TTWF) is '1' (i.e., TTWF=1), the MS returns to normal operation (i.e., active mode) upon receiving an MOB_TRF_IND(1) message. The MOB_TRF_IND(1) message indicates to the MS that there is DL data traffic ready to be transmitted to the MS. If TTWF=0, power saving class is not deactivated if traffic appears. In other words, data traffic is allowed in sleep mode if TTWF=0. However, data traffic is transmitted only in listening intervals, which are of a fixed short duration. The MS also automatically returns to normal operation whenever the MS has UL data ready for transmission.

With PSC type II, all sleep windows are of the same size, and interleaved with listening windows of a fixed duration. Similar to PSC type I, the MS exits Sleep Mode when the MS needs to or is instructed by a base station (BS) to do so. For PSC types I and II, the definition of sleep and listening windows and the activation of Sleep Mode require sending MAC messages (e.g., MS initiated MOB_SLP-REQ, (bandwidth request) BR, or UL Sleep Control messages; and BS initiated MOB_SLP-RSP message or DL Sleep Control Extended Subheader). The deactivation of Sleep Mode requires a BS to send an MOB_TRF-IND message with a positive indicator when TTWF=1. Alternatively, MAC message RNG-REQ also can be used to define, activate and deactivate Sleep Mode as well.

With PSC type III, signaling methods for defining and activating sleep window are the same as PSC types I and II. The difference is that the deactivation of Sleep Mode occurs automatically at the end of a sleep window (i.e., each sleep cycle lasts just one time period and one sleep window needs one definition/activation) with PSC type III.

Using the above power saving schemes, when TTWF=1, the MS has to leave the sleep mode for data traffic delivery regardless if the data traffic is for DL or UL. For light bursty traffic, the MS may go back and forth between active mode and sleep mode frequently. This results in a significant exchange of MOB_SLP_REQ/RSP messages (i.e., a high signaling overhead).

When TTWF=0, the MS could receive data without leaving sleep mode. However, the disadvantage is that the MS can only receive data in the listening interval. Consequently, the remaining data has to be transmitted in the following listening intervals. Moreover, the sleep interval still doubles even though there is positive traffic indication.

Thus, the above power saving operations are more concerned with packet latency than power saving performance in sleep mode as the definition, activation, deactivation and reactivation of discontinuous reception (DRX) are all driven by signaling. Accordingly, a significant amount of signaling overhead would be invoked if a power saving configuration were to adapt to changing MS traffic pattern and activity level using the above power saving operations. This high signaling overhead requires considerable power to maintain the sleep state of the traditional communication system. As a consequence, this high signaling overhead requires considerable power and has a corresponding drain upon the battery life of the device.

Accordingly, there is a need in the art for a system and method that effectively handle the sleep mode to adapt to changing MS traffic pattern and activity level. In particular, there is a need for a system and method for effectively handling the sleep mode that effectively reduce power consumption by adapting to changing MS traffic pattern and activity level without an increase in signaling overhead.

SUMMARY OF THE INVENTION

A wireless communication network comprising a plurality of base stations capable of wireless communication with a plurality of subscriber stations within a coverage area of the network, wherein at least one of the plurality of base stations is capable of transmitting, to a subscriber station, a traffic indication message with an indicator value, wherein the indicator value is used by both the base station and the subscriber station to dynamically adjust the length of the next discontinuous reception (DRX) cycle in an absence of an explicit signaling message from the base station.

A base station capable of wireless communication with a plurality of subscriber stations within a coverage area of a network, where the base station is capable of transmitting, to a subscriber station, a traffic indication message with an indicator value, wherein the indicator value is used by both the base station and the subscriber station to dynamically adjust the length of the next discontinuous reception (DRX) cycle in an absence of an explicit signaling message from the base station.

A method of operating a base station comprising transmitting, to a subscriber station, traffic indication message with an indicator value, wherein the indicator value is used by both the base station and the subscriber station to dynamically adjust the length of the next discontinuous reception (DRX) cycle in an absence of an explicit signaling message from the base station.

A mobile station capable of receiving, from a base station, a traffic indication message with an indicator value, wherein the indicator value is used by both the base station and the subscriber station to dynamically adjust the length of the next discontinuous reception (DRX) cycle in an absence of an explicit signaling message from the base station.

A mobile station capable of upon receiving, from a base station, a traffic indication message with an indicator indicating that there is no downlink transmission for the mobile station, setting a next discontinuous reception (DRX) cycle minus a fixed listening interval (FLI) to be half of a previous DRX cycle minus the fixed listening interval (FLI), and setting an appropriate portion of the next DRX cycle as an available interval for uplink transmission, wherein the mobile station sets the next DRX cycle and an appropriate portion of the next DRX cycle as an available interval for uplink transmission in an absence of an explicit signaling message from the base station.

A mobile station capable of upon receiving a data packet from a base station, waiting for a predetermined available interval for additional data packets, and performing at least one of automatically entering sleep mode and automatically entering active mode at the end of the predetermined available interval in an absence of an explicit signaling message from the base station.

A wireless communication network comprising a plurality of base stations capable of wireless communication with a plurality of subscriber stations within a coverage area of the network, wherein at least one of the plurality of base stations is capable of negotiating a length of an available interval with a subscriber station before the subscriber station enters sleep mode, and transmitting data packets to the subscriber station during the available interval, wherein the subscriber station performs at least one of automatically entering sleep mode and automatically entering active mode at the end of the predetermined available interval in an absence of an explicit signaling message from the base station.

A base station capable of wireless communication with a plurality of subscriber stations within a coverage area of a network, where the base station is capable of negotiating a length of an available interval with a subscriber station before the subscriber station enters sleep mode and transmitting data packets to the subscriber station during the available interval, wherein the subscriber station performs at least one of automatically entering sleep mode and automatically entering active mode at the end of the predetermined available interval in an absence of an explicit signaling message from the base station.

A method of operating a base station comprising negotiating a length of an available interval with a subscriber station before the subscriber station enters sleep mode, and transmitting data packets to the subscriber station during the available interval, wherein the subscriber station performs at least one of automatically entering sleep mode and automatically entering active mode at the end of the predetermined available interval in an absence of an explicit signaling message from the base station.

A wireless communication network comprising a plurality of base stations capable of wireless communication with a plurality of subscriber stations within a coverage area of the network, wherein at least one of the plurality of base stations is capable of transmitting a message to a subscriber station informing the subscriber station of a length of an available interval at the beginning of a discontinuous reception (DRX) cycle and transmitting data packets to the subscriber station during the available interval, wherein the subscriber station performs at least one of automatically entering sleep mode and automatically entering active mode at the end of the available interval in an absence of an explicit signaling message from the base station.

A base station capable of wireless communication with a plurality of subscriber stations within a coverage area of a network, where the base station is capable of transmitting a message to a subscriber station informing the subscriber station of a length of an available interval at the beginning of a discontinuous reception (DRX) cycle, and transmitting data packets to the subscriber station during the available interval, wherein the subscriber station performs at least one of automatically entering sleep mode and automatically entering active mode at the end of the available interval in an absence of an explicit signaling message from the base station.

A method of operating a base station comprising transmitting a message to a subscriber station informing the subscriber station of a length of an available interval at the beginning of a discontinuous reception (DRX) cycle, and transmitting data packets to the subscriber station during the available interval, wherein the subscriber station performs at least one of automatically entering sleep mode and automatically entering active mode at the end of the available interval in an absence of an explicit signaling message from the base station.

A mobile station capable of, in response to detecting that a negative traffic indication message from a base station was lost during a listening interval, marking the current time as fail time, automatically resetting a current pseudo sleep interval (PSI) to a minimum pseudo sleep interval, and attempting a number of re-trials during a number of consecutive discontinuous reception (DRX) cycles implementing the minimum pseudo sleep interval, wherein the current pseudo sleep interval is reset to the minimum pseudo sleep interval in an absence of an explicit signaling message from the base station.

A mobile station capable of, in response to detecting that a positive traffic indication message from a base station was lost during a listening interval, automatically resetting a current pseudo sleep interval (PSI) to a minimum pseudo sleep interval, wherein the current pseudo sleep interval is reset to the minimum pseudo sleep interval in an absence of an explicit signaling message from the base station, wherein the base station also resets the current pseudo sleep interval to the minimum pseudo sleep interval, and wherein re-synchronization with the base station is achieved at the next discontinuous reception (DRX) cycle.

A mobile station capable of, in response to receiving a traffic indication message indicating that there is downlink data ready for transmission from a base station, transmitting an acknowledgment message, and automatically resetting a current pseudo sleep interval (PSI) to a minimum pseudo sleep interval, wherein the mobile station automatically resets the current pseudo sleep interval to the minimum pseudo sleep interval in an absence of an explicit signaling message from the base station, wherein in response to not receiving the acknowledgment message, the base station also automatically resets the current pseudo sleep interval to the minimum pseudo sleep interval, and wherein re-synchronization with the base station is achieved at the next discontinuous reception (DRX) cycle.

A mobile station capable of, in response to receiving a traffic indication message indicating that there is no downlink data ready for transmission from a base station, transmitting a bandwidth request message, automatically resetting a current pseudo sleep interval (PSI) to a minimum pseudo sleep interval, and attempting a number of re-trials during a number of consecutive discontinuous reception (DRX) cycles implementing the minimum pseudo sleep interval, wherein the current pseudo sleep interval is reset to the minimum pseudo sleep interval in an absence of an explicit signaling message from the base station.

A mobile station capable of, in response to receiving a traffic indication message indicating that there is no downlink data ready for transmission from a base station, transmitting a bandwidth request message, and automatically resetting a current pseudo sleep interval (PSI) to a minimum pseudo sleep interval, wherein the mobile station automatically resets the current pseudo sleep interval to the minimum pseudo sleep interval in an absence of an explicit signaling message from the base station, wherein the base station also resets the current pseudo sleep interval to the minimum pseudo sleep interval upon transmitting an uplink resource allocation message, and wherein re-synchronization with the base station is achieved at the next discontinuous reception (DRX) cycle.

A wireless communication network comprising a plurality of base stations capable of wireless communication with a plurality of mobile stations within a coverage area of the network, wherein at least one of the plurality of base stations is capable of transmitting a traffic indication message with downlink traffic data to a mobile station, and if the base station does not receive an acknowledgment message from the mobile station in response to the traffic indication message, automatically resetting a current pseudo sleep interval (PSI) to a minimum pseudo sleep interval, and re-transmitting the traffic indication message and the downlink traffic data to the mobile station at the next discontinuous reception (DRX) cycle with the pseudo sleep interval set to the minimum pseudo sleep interval.

A base station capable of wireless communication with a plurality of mobile stations within a coverage area of a network, where the base station is capable of transmitting a traffic indication message with downlink traffic data to a mobile station, and if the base station does not receive an acknowledgment message from the mobile station in response to the traffic indication message, automatically resetting a current pseudo sleep interval (PSI) to a minimum pseudo sleep interval, and re-transmitting the traffic indication message and the downlink traffic data to the mobile station at the next discontinuous reception (DRX) cycle with the pseudo sleep interval set to the minimum pseudo sleep interval.

A method of operating a base station comprising transmitting a traffic indication message with downlink traffic data to a mobile station, and if the base station does not receive an acknowledgment message from the mobile station in response to the traffic indication message, automatically resetting a current pseudo sleep interval (PSI) to a minimum pseudo sleep interval, and re-transmitting the traffic indication message and the downlink traffic data to the mobile station at the next discontinuous reception (DRX) cycle with the pseudo sleep interval set to the minimum pseudo sleep interval.

A wireless communication network comprising a plurality of base stations capable of wireless communication with a plurality of mobile stations within a coverage area of the network, wherein at least one of the plurality of base stations is capable of transmitting a traffic indication message indicating that there is no downlink data ready for transmission to a mobile station, and automatically increasing the current pseudo sleep interval (PSI) to twice the length of the previous pseudo sleep interval, wherein if the traffic indication message is lost, the mobile station notes a fail time and after attempting a pre-determined number of times to re-synchronize with the base station using a discontinuous reception (DRX) cycle with a minimum pseudo listening interval (PSI), automatically uses a pseudo sleep interval that is twice the length of the pseudo sleep interval prior to fail time in an absence of an explicit signaling message from the base station and re-synchronizes with the base station using the pseudo sleep interval that is twice the length of the pseudo sleep interval prior to fail time.

A base station capable of wireless communication with a plurality of mobile stations within a coverage area of a network, where the base station is capable of transmitting a traffic indication message indicating that there is no downlink data ready for transmission to a mobile station, and automatically increasing the current pseudo sleep interval (PSI) to twice the length of the previous pseudo sleep interval, wherein if the traffic indication message is lost, the mobile station notes a fail time and after attempting a pre-determined number of times to re-synchronize with the base station using a discontinuous reception (DRX) cycle with a minimum pseudo listening interval (PSI), automatically uses a pseudo sleep interval that is twice the length of the pseudo sleep interval prior to fail time in an absence of an explicit signaling message from the base station and re-synchronizes with the base station using the pseudo sleep interval that is twice the length of the pseudo sleep interval prior to fail time.

A method of operating a base station comprising transmitting a traffic indication message indicating that there is no downlink data ready for transmission to a mobile station, and automatically increasing the current pseudo sleep interval (PSI) to twice the length of the previous pseudo sleep interval, wherein if the traffic indication message is lost, the mobile station notes a fail time and after attempting a pre-determined number of times to re-synch with the base station using a discontinuous reception (DRX) cycle with a minimum pseudo listening interval (PSI), automatically uses a pseudo sleep interval that is twice the length of the pseudo sleep interval prior to fail time in an absence of an explicit signaling message from the base station and re-synchronizes with the base station using the pseudo sleep interval that is twice the length of the pseudo sleep interval prior to fail time.

A wireless communication network comprising a plurality of base stations capable of wireless communication with a plurality of mobile stations within a coverage area of the network, wherein at least one of the plurality of base stations is capable of transmitting a traffic indication message indicating that there is no downlink data ready for transmission to a mobile station, and automatically increasing the current pseudo sleep interval (PSI) to twice the length of the previous pseudo sleep interval, wherein if the traffic indication message is lost, the mobile station automatically attempts the last re-trial with the pseudo sleep interval beginning from the fail time set to twice the length of the pseudo sleep interval prior to the fail time in an absence of an explicit signaling message from the base station.

A base station capable of wireless communication with a plurality of mobile stations within a coverage area of a network, where the base station is capable of transmitting a traffic indication message indicating that there is no downlink data ready for transmission to a mobile station, and automatically increasing the current pseudo sleep interval (PSI) to twice the length of the previous pseudo sleep interval, wherein if the traffic indication message is lost, the mobile station automatically attempts the last re-trial with the pseudo sleep interval beginning from the fail time set to twice the length of the pseudo sleep interval prior to the fail time in an absence of an explicit signaling message from the base station.

A method of operating a base station comprising transmitting a traffic indication message indicating that there is no downlink data ready for transmission to a mobile station, and automatically increasing the current pseudo sleep interval (PSI) to twice the length of the previous pseudo sleep interval, wherein if the traffic indication message is lost, the mobile station automatically attempts the last re-trial with the pseudo sleep interval beginning from the fail time set to twice the length of the pseudo sleep interval prior to the fail time in an absence of an explicit signaling message from the base station.

A wireless communication network comprising a plurality of base stations capable of wireless communication with a plurality of mobile stations within a coverage area of the network, wherein at least one of the plurality of base stations is capable of transmitting a traffic indication message indicating that there is downlink data ready for transmission to a mobile station, and automatically resetting the current pseudo sleep interval (PSI) to a minimum pseudo sleep interval, wherein upon receiving the traffic indication message, the mobile station automatically resets the current pseudo sleep interval to the minimum pseudo sleep interval in an absence of an explicit signaling message from the base station.

A base station capable of wireless communication with a plurality of mobile stations within a coverage area of a network, where the base station is capable of transmitting a traffic indication message indicating that there is downlink data ready for transmission to a mobile station, and automatically resetting the current pseudo sleep interval (PSI) to a minimum pseudo sleep interval, wherein upon receiving the traffic indication message, the mobile station automatically resets the current pseudo sleep interval to the minimum pseudo sleep interval in an absence of an explicit signaling message from the base station.

A method of operating a base station comprising transmitting a traffic indication message indicating that there is downlink data ready for transmission to a mobile station, and automatically resetting the current pseudo sleep interval (PSI) to a minimum pseudo sleep interval, wherein upon receiving the traffic indication message, the mobile station automatically resets the current pseudo sleep interval to the minimum pseudo sleep interval in an absence of an explicit signaling message from the base station.

A wireless communication network comprising a plurality of base stations capable of wireless communication with a plurality of mobile stations within a coverage area of the network, wherein at least one of the plurality of base stations is capable of transmitting a traffic indication message indicating that there is no downlink data ready for transmission to a mobile station, and automatically increasing the current pseudo sleep interval (PSI) to twice the length of the previous pseudo sleep interval, wherein the mobile station automatically attempts the last re-trial with the original pseudo sleep interval set to twice the length of the previous pseudo sleep interval in an absence of an explicit signaling message from the base station even when a bandwidth request message from the mobile station is lost.

A base station capable of wireless communication with a plurality of mobile stations within a coverage area of a network, where the base station is capable of transmitting a traffic indication message indicating that there is no downlink data ready for transmission to a mobile station, and automatically increasing the current pseudo sleep interval (PSI) to twice the length of the previous pseudo sleep interval, wherein the mobile station automatically attempts the last re-trial with the original pseudo sleep interval set to twice the length of the previous pseudo sleep interval in an absence of an explicit signaling message from the base station even when a bandwidth request message from the mobile station is lost.

A wireless communication network comprising a plurality of base stations capable of wireless communication with a plurality of mobile stations within a coverage area of the network, wherein at least one of the plurality of base stations is capable of receiving a bandwidth request message from a mobile station, and automatically resetting the current pseudo sleep interval (PSI) to a minimum pseudo sleep interval, wherein upon transmitting the bandwidth request message, the mobile station automatically resets the current pseudo sleep interval to the minimum pseudo sleep interval in an absence of an explicit signaling message from the base station.

A base station capable of wireless communication with a plurality of mobile stations within a coverage area of a network, where the base station is capable of receiving a bandwidth request message from a mobile station, and automatically resetting the current pseudo sleep interval (PSI) to a minimum pseudo sleep interval, wherein upon transmitting the bandwidth request message, the mobile station automatically resets the current pseudo sleep interval to the minimum pseudo sleep interval in an absence of an explicit signaling message from the base station.

A method of operating a base station comprising receiving a bandwidth request message from a mobile station, and automatically resetting the current pseudo sleep interval (PSI) to a minimum pseudo sleep interval, wherein upon transmitting the bandwidth request message, the mobile station automatically resets the current pseudo sleep interval to the minimum pseudo sleep interval in an absence of an explicit signaling message from the base station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 29, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Figure 1:
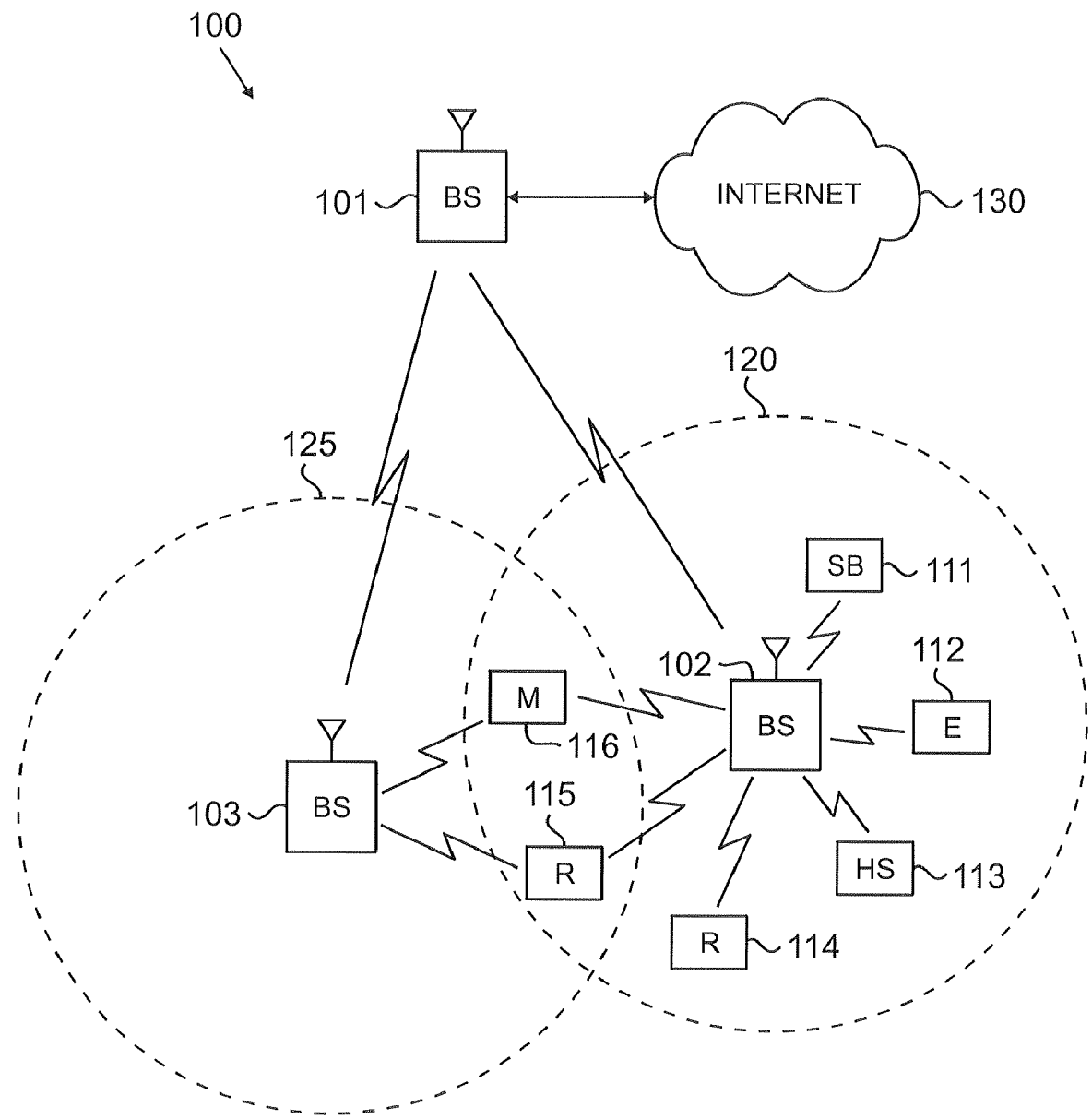
FIG. 1 illustrates an exemplary wireless network that transmits messages in the uplink according to the principles of the present disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
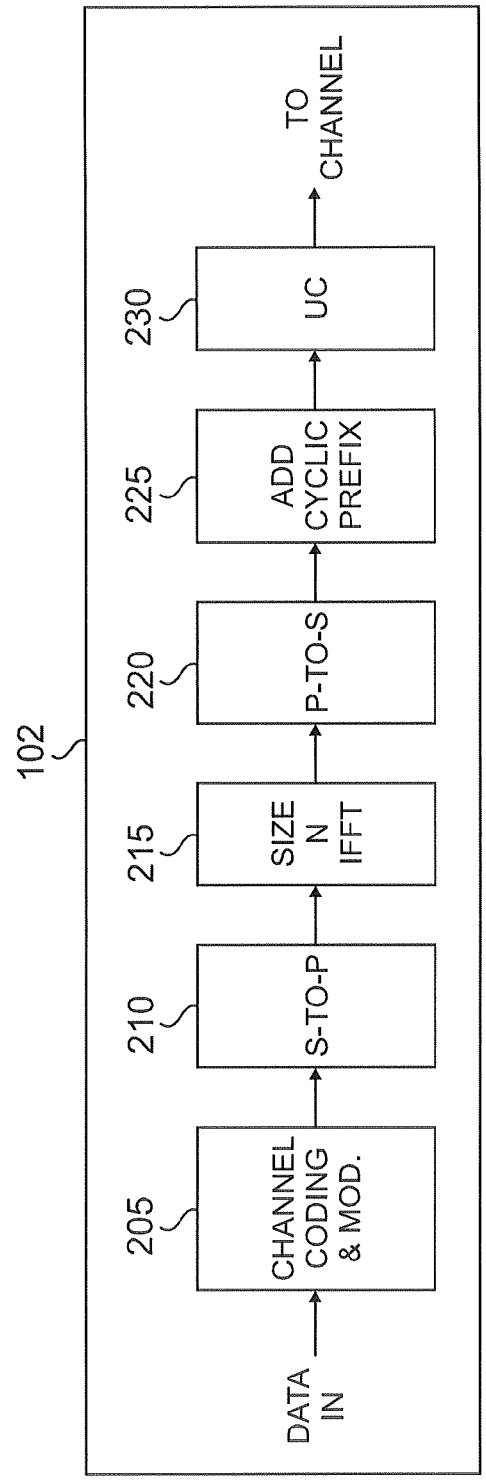
FIG. 2A is a high-level diagram of an OFDMA transmitter according to one embodiment of the present disclosure.
Figure 2B:
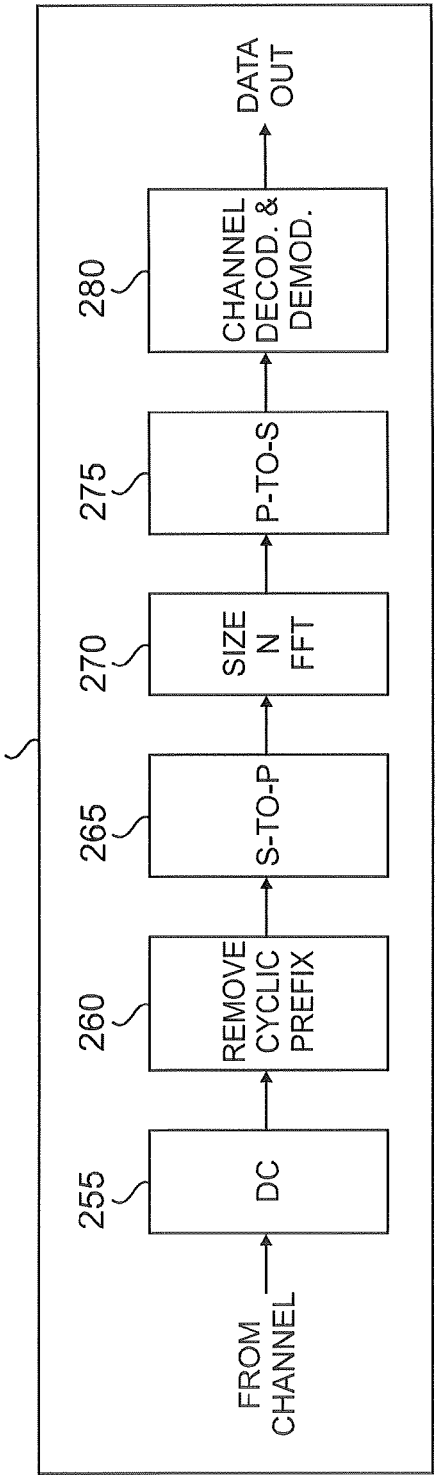
FIG. 2B is a high-level diagram of an OFDMA receiver according to one embodiment of the present disclosure.

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The present disclosure discloses a system and method for handling the sleep mode that effectively reduce power consumption by adapting to changing MS traffic pattern and activity level without an increase in signaling overhead.

In order to facilitate a description of the system and method of the present disclosure, the following terms and abbreviations will be defined:

DRX: discontinuous reception;
FLI: fixed listening interval;
ELI: extended listening interval;
AI: available interval;
SI: sleep interval;
PSI: pseudo sleep interval; and
WI: waiting interval.

The following relationships hold for the above terms:

$$DRX\ cycle=AI+SI=FLI+PSI;$$

$$AI=FLI+ELI;$$

$$PSI=ELI+SI=DRX\ cycle-FLI;$$

AI in [FLI, DRX cycle];
ELI in [0, PSI]; and
SI in [0, PSI].

With regard to the following description, ELI is assumed to be an integer number of FLI. In other words, the unit of AI is FLI. WI=FLI also is assumed. However, these assumptions are simply used to facilitate a description of the system and method of the present disclosure. The present disclosure is not limited to these assumptions as the present disclosure also includes, for example, embodiments in which the BS and the MS negotiate the unit of ELI and the size of WI before the MS enters the sleep mode.

Figure 3:
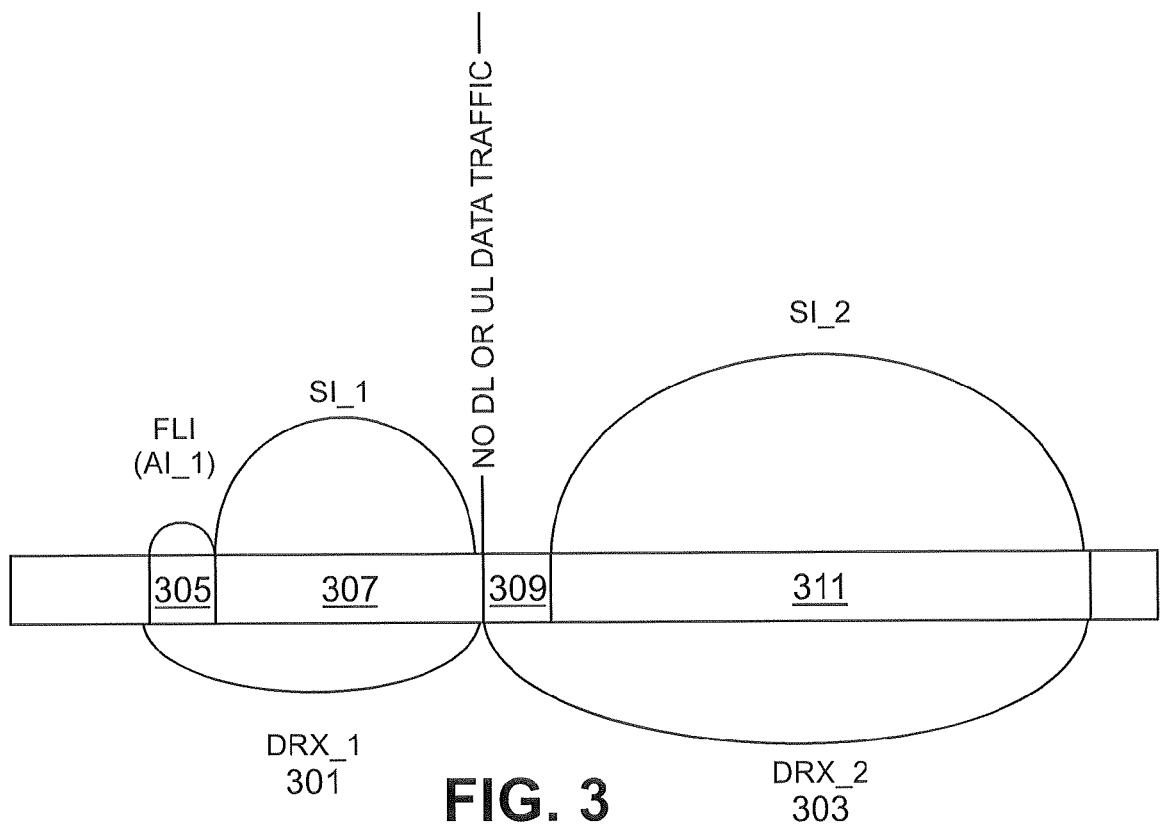
FIG. 3 illustrates discontinuous reception (DRX) cycles when there is no downlink or uplink data traffic ready for transmission at the beginning of a DRX cycle according to an embodiment of the present disclosure.

FIG. 3 illustrates discontinuous reception (DRX) cycles when there is no DL or UL data traffic ready for transmission at the beginning of a DRX cycle according to an embodiment of the present disclosure.

FIG. 3 illustrates a first DRX cycle 301 and a subsequent second DRX cycle 303. Intervals 305 and 309 represent fixed listening intervals (FLIs) where an MS in a listening state. Intervals 307 and 311 represent sleep intervals (SIs) where the MS is in a sleep state. The first DRX cycle 301=FLI+SI_1 (i.e., the first DRX cycle 301=listening interval 305+sleep interval 307) and PSI_1=SI_1 or sleep interval 307. Also, the second DRX cycle 303=FLI+SI_2 (i.e., the second DRX cycle 303=listening interval 309+sleep interval 311), and PSI_2=SI_2 or sleep interval 311.

In this embodiment, because there is no traffic at the beginning of the second DRX cycle 303, the pseudo sleep interval (PSI) of the second DRX cycle 303 is doubled from the previous PSI (i.e., PSI_2=2*PSI_1) unless PSI_1 is already of a predetermined maximum size. Accordingly, in this embodiment, the PSI of the subsequent DRX cycle is automatically extended when there is no traffic without explicit signaling from a BS.

Figure 4:
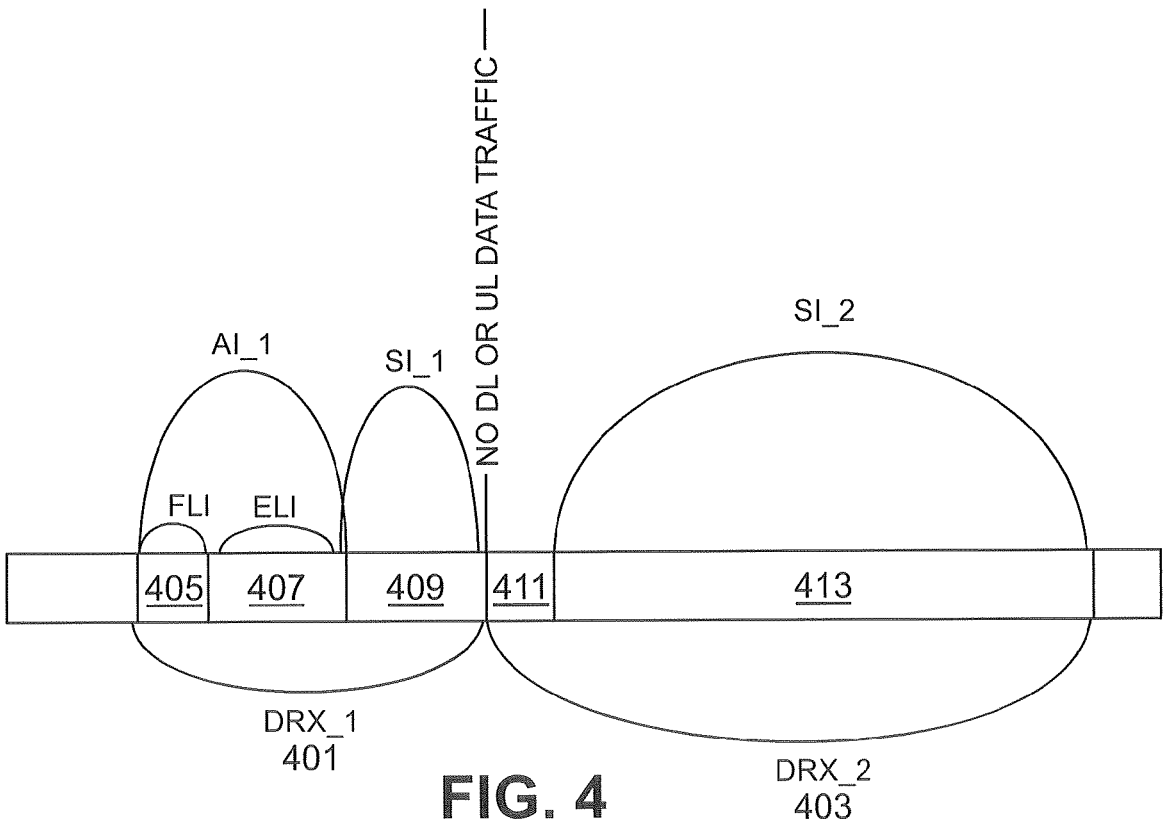
FIG. 4 illustrates discontinuous reception (DRX) cycles when there is no downlink or uplink data traffic ready for transmission at the beginning of a DRX cycle according to another embodiment of the present disclosure.

FIG. 4 illustrates discontinuous reception (DRX) cycles when there is no DL or UL data traffic ready for transmission at the beginning of a DRX cycle according to another embodiment of the present disclosure.

FIG. 4 illustrates a first DRX cycle 401 and a subsequent second DRX cycle 403. Intervals 405 and 411 represent fixed listening intervals (FLIs), and interval 407 represents an extended listening interval. An MS is in a listening state during intervals 405, 407, and 411. Intervals 409 and 413 represent sleep intervals (SIs) where the MS is in a sleep state. The first DRX cycle 401=AI_1+SI_1 (i.e., the first DRX cycle 401=listening interval 405+listening interval 407+sleep interval 409) and PSI_1=DRX_1−FLI (i.e., PSI_1=extended listening interval 407+sleep interval 409). In this embodiment, AI stands for an available interval during which the MS is available for data traffic. As shown in FIGS. 3 and 4, FLI is a part of AI. Also the second DRX cycle 403=FLI+SI_2 (i.e., the second DRX cycle 403=fixed listening interval 411+sleep interval 413), and PSI_2=SI_2 or sleep interval 413. Because there is no traffic at the beginning of the second DRX cycle 403 in this embodiment, PSI_2=2*PSI_1.

As with the previous embodiment, because there is no traffic at the beginning of the second DRX cycle 403, the pseudo sleep interval (PSI) of the second DRX cycle 403 is doubled from the previous PSI (i.e., PSI_2=2*PSI_1) unless PSI_1 is already of a predetermined maximum size. Again, the PSI of the subsequent DRX cycle is automatically extended when there is no traffic without explicit signaling from a BS.

In summary, the DRX cycle in this disclosure consists of an available interval (AI) and a sleep interval (SI). AI is understood to be at least as large as the fixed listening interval (FLI). SI is larger than or equal to zero. If there is no traffic to be transmitted at the beginning of a DRX cycle, the PSI for that DRX cycle is set to be twice the length of the previous PSI, unless the previous PSI is already of a predetermined maximum size.

Figure 5:
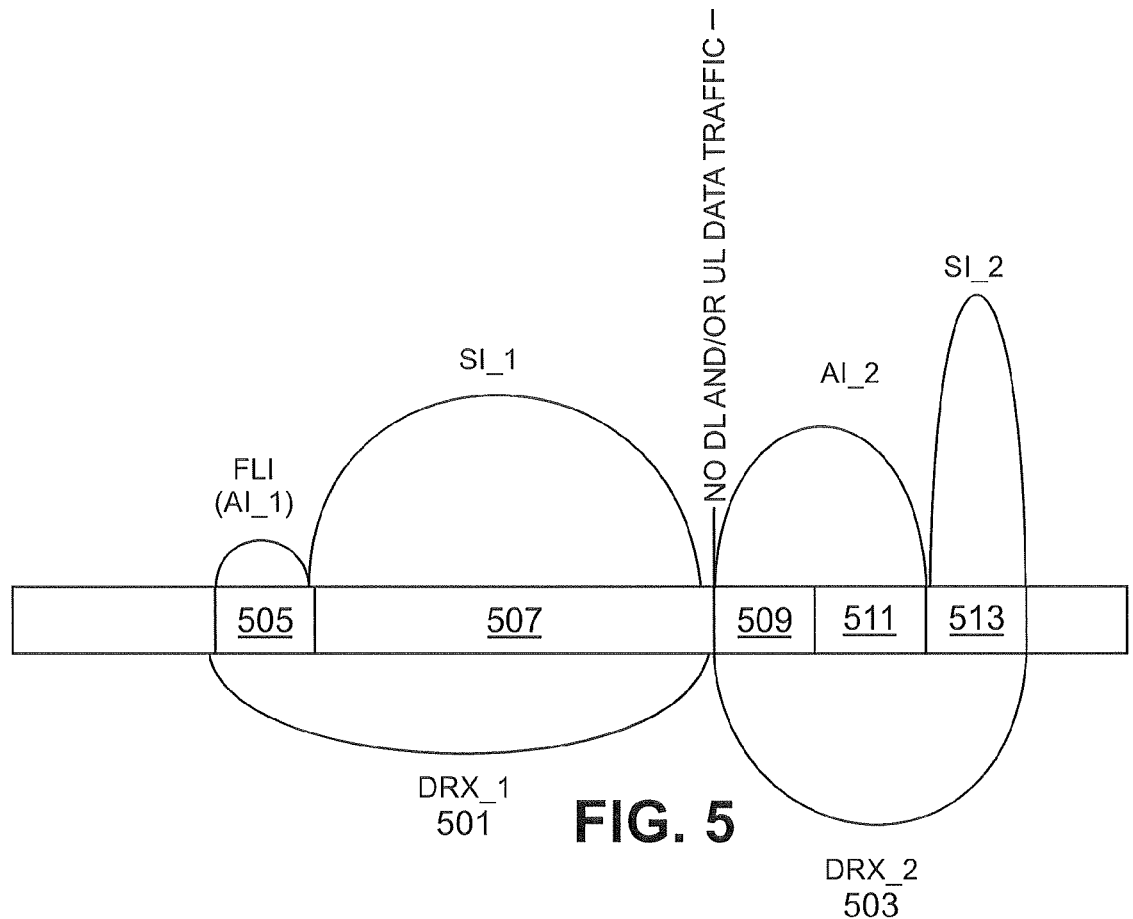
FIG. 5 illustrates discontinuous reception (DRX) cycles when there is downlink and/or uplink data traffic ready for transmission at the beginning of a DRX cycle according to an embodiment of the present disclosure.

FIG. 5 illustrates discontinuous reception (DRX) cycles when there is DL and/or UL data traffic ready for transmission at the beginning of a DRX cycle according to an embodiment of the present disclosure.

FIG. 5 illustrates a first DRX cycle 501 and a subsequent second DRX cycle 503 when there is DL and/or UL data traffic ready for transmission in the beginning of the second DRX cycle 503. Intervals 505 and 509 represent fixed listening intervals (FLIs) and interval 511 represents an extended listening interval. An MS is in a listening state during intervals 505, 509, and 511. Intervals 507 and 513 represent sleep intervals (SIs) where the MS is in a sleep state. The first DRX cycle 501=FLI+SI_1 (i.e., the first DRX cycle 501=listening interval 505+sleep interval 507) and PSI_1=first DRX cycle 501−interval 505 (i.e., PSI_1=SI_1 or sleep interval 507). Also, the second DRX cycle 503=AI_2+SI_2 (i.e., the second DRX cycle 503=fixed listening interval 509+extended listening interval 511+sleep interval 513), and PSI_2=DRX_2−FLI (i.e., PSI_2=extended listening interval 511+sleep interval 513) which is half of PSI_1.

In this embodiment, because there is traffic ready to be transmitted at the beginning of the second DRX cycle 503, the pseudo sleep interval (PSI) of the second DRX cycle 503 is set to be half of the previous PSI (i.e., PSI_2=0.5*PSI_1) unless PSI_1 is already of a predetermined minimum size. Accordingly, in this embodiment, the PSI of the subsequent DRX cycle is automatically shortened when there is traffic to be transmitted without explicit signaling from a BS.

Figure 6:
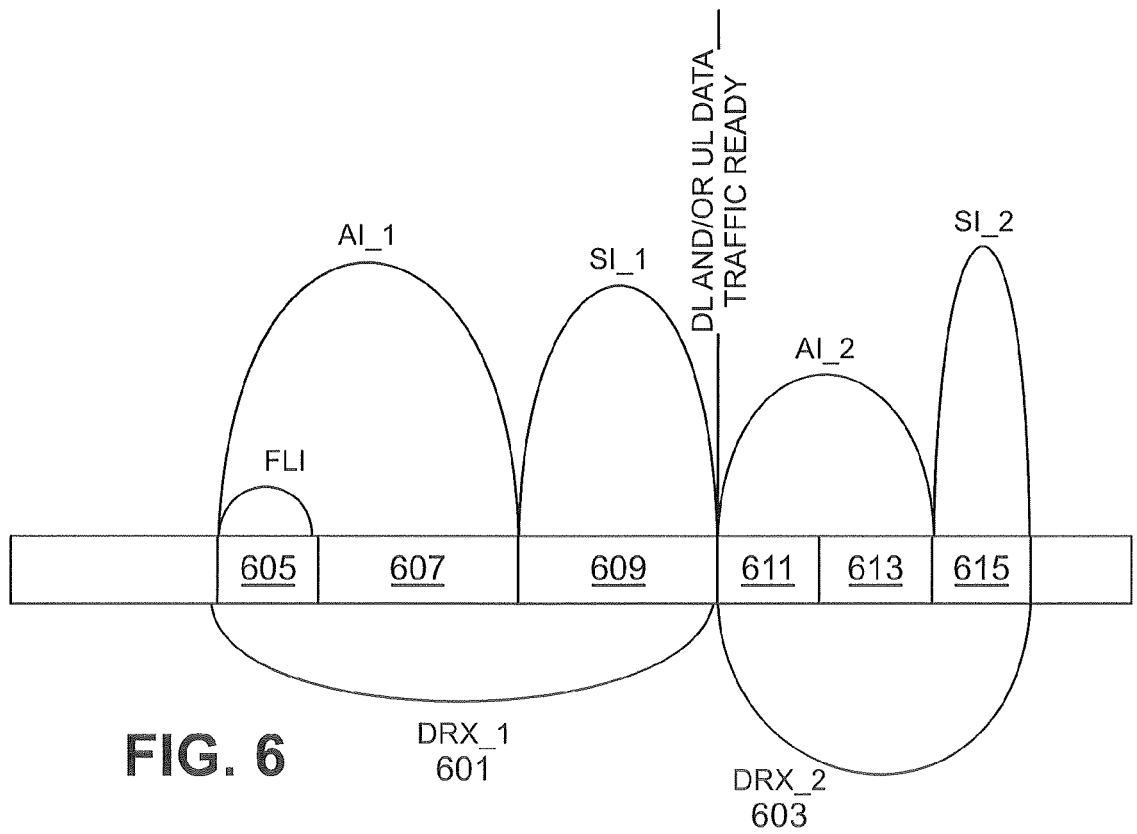
FIG. 6 illustrates discontinuous reception (DRX) cycles when there is downlink and/or uplink data traffic ready for transmission at the beginning of a DRX cycle according to another embodiment of the present disclosure.

FIG. 6 illustrates discontinuous reception (DRX) cycles when there is DL and/or UL data traffic ready for transmission at the beginning of a DRX cycle according to another embodiment of the present disclosure.

FIG. 6 illustrates a first DRX cycle 601 and a subsequent second DRX cycle 603 when there is DL and/or UL data traffic ready for transmission at the beginning of the second DRX cycle 603. Intervals 605 and 611 represent fixed listening intervals (FLIs), and intervals 607 and 613 represent extended listening intervals. An MS is in a listening state during intervals 605, 607, 611, and 613. Intervals 609 and 615 represent sleep intervals (SIs) where the MS is in a sleep state. The first DRX cycle 601=AI_1+SI_1 (i.e., the first DRX cycle 601=fixed listening interval 605+extended listening interval 607+sleep interval 609), and PSI_1=first DRX cycle 601−FLI (i.e., PSI_1=extended listening interval 607+sleep interval 609). Also, the second DRX cycle 603=AI_2+SI_2 (i.e., the second DRX cycle 603 fixed listening interval 611+ extended listening interval 613+sleep interval 615), and PSI_2=DRX_2−FLI (i.e., PSI_2=extended listening interval 613+sleep interval 615) which is half of PSI_1.

In this embodiment, because there is traffic ready to be transmitted at the beginning of the second DRX cycle 603, the pseudo sleep interval (PSI) of the second DRX cycle 603 is set to be half of the previous PSI (i.e., PSI_2=0.5*PSI_1) unless PSI_1 is already of a predetermined minimum size. Accordingly, in this embodiment, the PSI of the subsequent DRX cycle is automatically shortened when there is traffic to be transmitted without explicit signaling from a BS.

Figure 7:
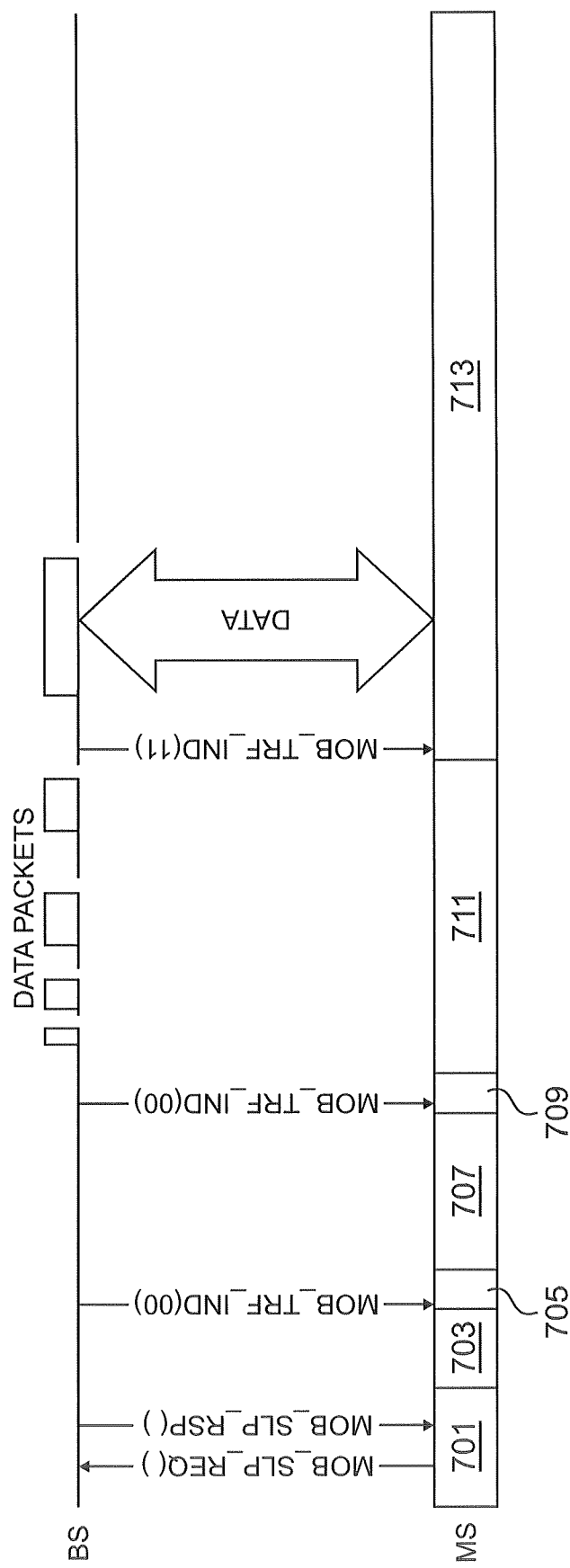
FIG. 7 illustrates discontinuous reception (DRX) cycles adjusted by a traffic indicator message comprising a two-bit indicator for indicating if there is data ready for transmission according to an embodiment of the present disclosure.

FIG. 7 illustrates discontinuous reception (DRX) cycles adjusted by a traffic indicator message comprising a two-bit indicator for indicating if there is data ready for transmission according to an embodiment of the present disclosure.

As shown in FIG. 7, intervals 701 and 713 represent the active mode for the MS. Intervals 703, 707, and 711 represent sleep intervals, and intervals 705 and 709 represent available intervals. After sleep interval 703, the MS receives an MOB_TRF_IND( ) message with an indicator having a first value indicating that there is no DL traffic. In this embodiment, the indicator is a two-bit value "00". Because the first value indicates to the MS that there is no DL traffic, the MS doubles the length of sleep interval 707 in the next DRX cycle. After sleep interval 707, the MS again receives an MOB_TRF_IND( ) message with the first value and again doubles the length of sleep interval 711 in the next DRX cycle.

After the sleep interval 711, the MS receives an MOB_TRF_IND( ) message with an indicator having a second value indicating that there may be a large volume of data ready for transmission. In this embodiment, the indicator is a two-bit value "11". Upon receiving an MOB_TRF_IND( ) message with an indicator having the second value, the MS immediately returns to normal operation or active mode and receives data at interval 713.

Accordingly, the sleep interval in this case is doubled when there is no DL traffic, or the MS is returned to active mode when there is a large volume of data ready for transmission without explicit signaling, such as a Traffic_triggered_wakening_flag (TTWF), from a BS. In some embodiments, the BS could use the second value to return the MS into active mode for any other reason.

Figure 8:
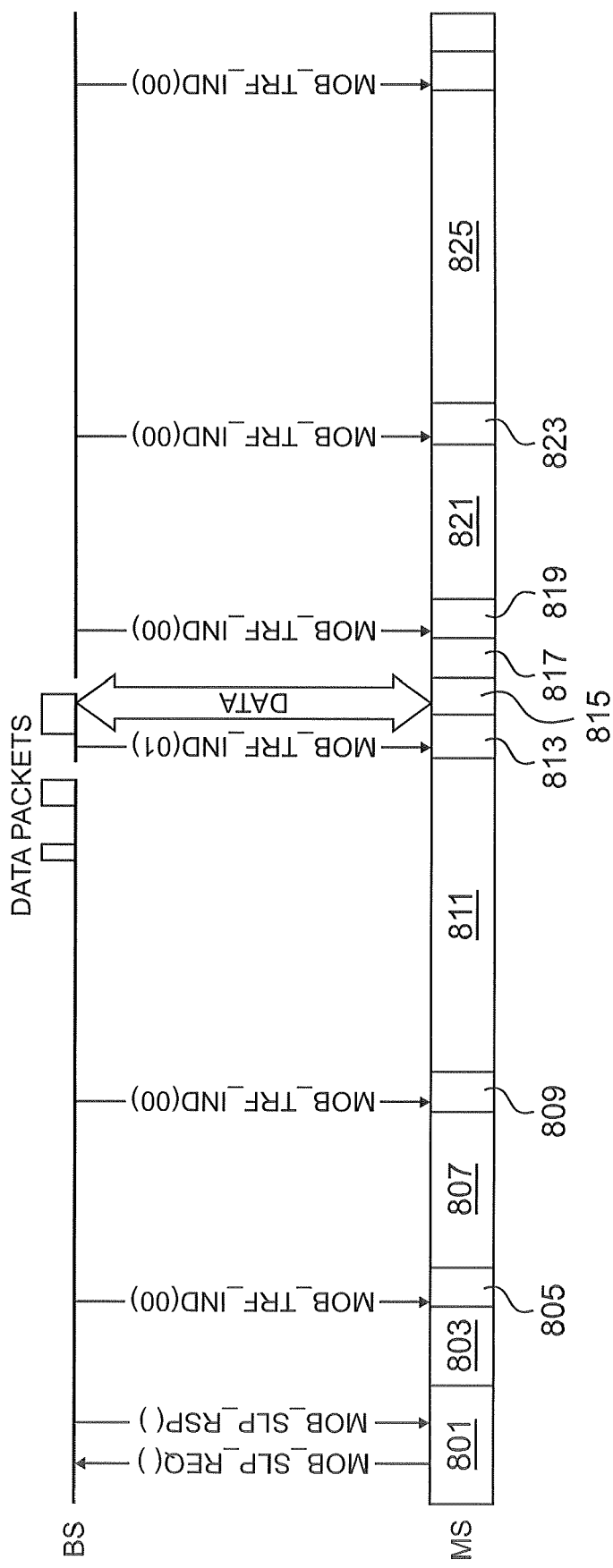
FIG. 8 illustrates discontinuous reception (DRX) cycles adjusted by a traffic indicator message comprising a two-bit indicator for indicating if there is data ready for transmission according to another embodiment of the present disclosure.

FIG. 8 illustrates discontinuous reception (DRX) cycles adjusted by a traffic indicator message comprising a two-bit indicator for indicating if there is data ready for transmission according to another embodiment of the present disclosure.

As shown in FIG. 8, interval 801 represents the active mode for the MS. Intervals 803, 807, 811, 817, 821, and 825 represent sleep intervals, and intervals 805, 809, 813, 815, 819, and 823 represent available intervals. In this embodiment, after sleep interval 803, the MS receives an MOB_TRF_IND( ) message with an indicator having the first value at available interval 805. Because the first value indicates to the MS that there is no DL traffic, the MS doubles the length of sleep interval 807 in the next DRX cycle. After sleep interval 807, the MS again receives an MOB_TRF_IND( ) message with the first value and again doubles the length of sleep interval 811 in the next DRX cycle.

After the sleep interval 811, the MS receives an MOB_TRF_IND( ) message with an indicator having a third value indicating that there is DL traffic ready for transmission at available interval 813. In this embodiment, the indicator is a two-bit value "01". However, unlike the second value that automatically returns the MS to active mode, the third value allows the MS to remain in sleep mode while receiving data. The MS automatically enters sleep interval if the MS finishes receiving data before the end of the current DRX cycle. After receiving an MOB_TRF_IND( ) message with an indicator having the third value, the MS sets the next DRX cycle equal to the minimum DRX cycle (i.e., the next DRX cycle=fixed listening interval+initial sleep interval).

In the embodiment shown in FIG. 8, the MS receives data during available interval 815 and sets the next pseudo sleep interval 815+817 to the length of the initial pseudo sleep interval 803. Because the MS receives an MOB_TRF_IND( ) message with an indicator having the first value during available intervals 805 and 809, the lengths of sleep intervals 807 and 811 are doubled from the previous sleep intervals.

Again, the sleep interval is adjusted according to the DL traffic without explicit signaling, such as a Traffic_triggered_wakening_flag (TTWF), from a BS.

Figure 9:
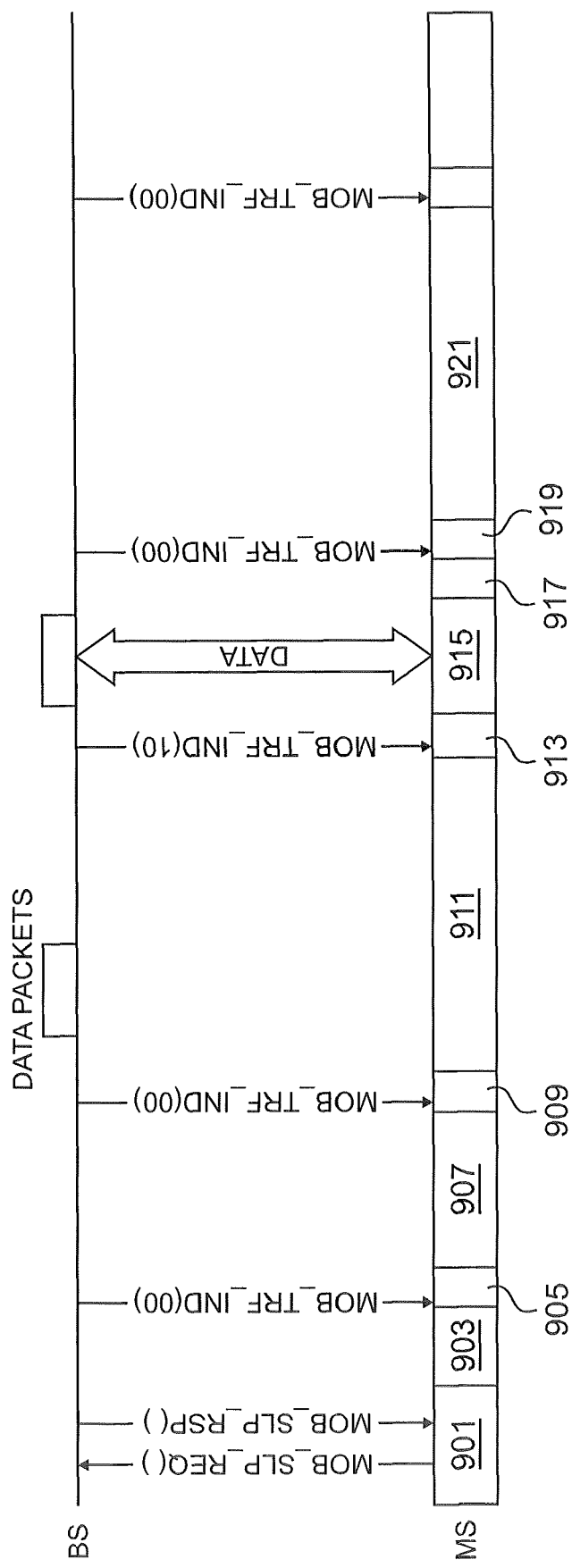
FIG. 9 illustrates discontinuous reception (DRX) cycles adjusted by a traffic indicator message comprising a two-bit indicator for indicating if there is data ready for transmission according to yet another embodiment of the present disclosure.

FIG. 9 illustrates discontinuous reception (DRX) cycles adjusted by a traffic indicator message comprising a two-bit indicator for indicating if there is data ready for transmission according to yet another embodiment of the present disclosure.

As shown in FIG. 9, interval 901 represents the active mode for the MS. Intervals 903, 907, 911, 917, and 921 represent sleep intervals, and intervals 905, 909, 913, 915, and 919 represent available intervals. In this embodiment, after sleep interval 903, the MS receives an MOB_TRF_IND( ) message with an indicator having the first value at available interval 905. Because the first value indicates to the MS that there is no DL traffic, the MS doubles the length of sleep interval 907 in the next DRX cycle. After sleep interval 907, the MS again receives an MOB_TRF_IND( ) message with the first value and again doubles the length of sleep interval 911 in the next DRX cycle.

After the sleep interval 911, the MS receives an MOB_TRF_IND( ) with an indicator having a fourth value indicating that there is DL traffic ready for transmission at available interval 913. In this embodiment, the indicator is a two-bit value "10". Like the third value, the fourth value allows the MS to remain in sleep mode while receiving data. The MS automatically enters sleep interval if the MS finishes receiving data before the end of the current DRX cycle. However, unlike the third value, upon receiving an MOB_TRF_IND( ) message with an indicator having the fourth value, the MS sets the next DRX cycle equal to the fixed listening interval plus half of the previous DRX cycle minus the fixed listening interval (i.e., next DRX cycle=FLI+½(previous DRX cycle−FLI)).

In the embodiment shown in FIG. 9, the MS receives data during available interval 915 and sets the next pseudo sleep interval 915+917 to the length of half of the previous pseudo sleep interval 911. Because the MS receives an MOB_TRF_IND( ) message with an indicator having the first value during available interval 919, the length of sleep interval 921 is doubled.

Again, the sleep interval is adjusted according to the DL traffic without explicit signaling, such as a Traffic_triggered_wakening_flag (TTWF), from a BS.

As described above, if the MS in sleep mode has UL data ready for transmission at the beginning of the next DRX cycle, there could be two general scenarios. The first general scenario is when there happens to be DL traffic that is also ready for transmission. In this case, the BS transmits one of the three two-bit indicators (e.g., "11", "01" or "10") indicating that there is traffic ready for transmission. These indicators will indicate to the MS which DRX cycle to use immediately following the MOB_TRF_IND( ) message. Accordingly, the MS will either go back to active mode or implement a longer available interval for handling traffic for both DL and UL.

Figure 10:
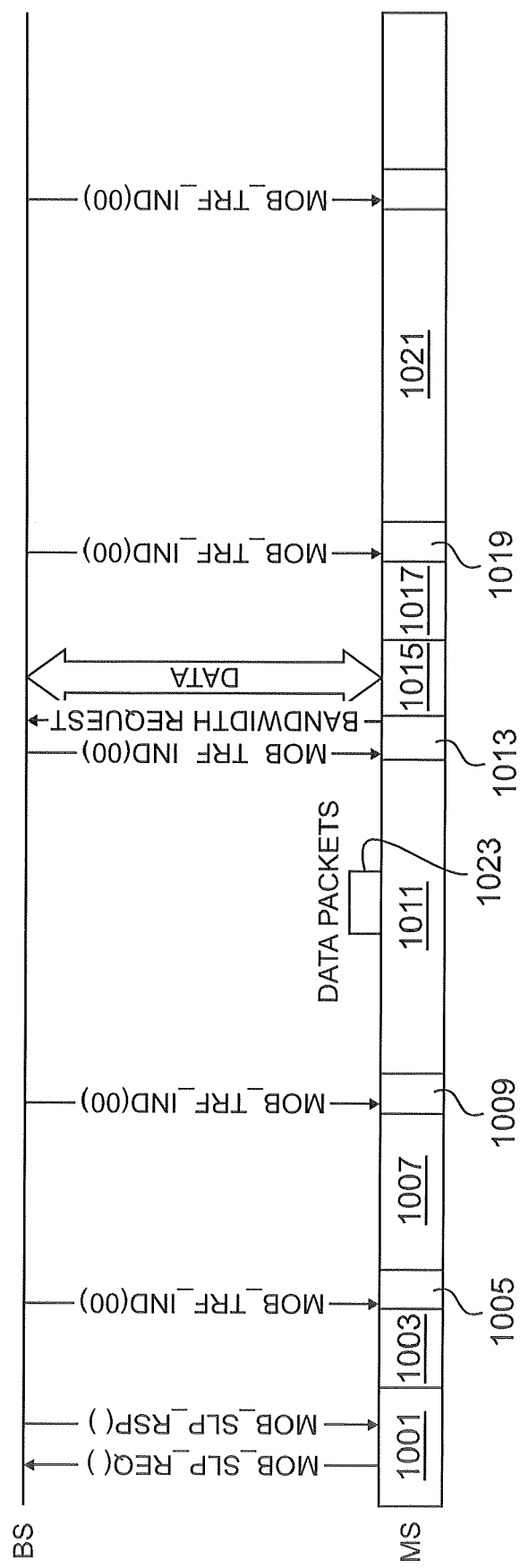
FIG. 10 illustrates discontinuous reception (DRX) cycles when a mobile station has UL data for transmission according to an embodiment of the present disclosure.

FIG. 10 illustrates discontinuous reception (DRX) cycles when a mobile station has UL data for transmission according to an embodiment of the present disclosure.

FIG. 10 illustrates the second scenario in which the MS receives an MOB_TRF_IND(00) message because the BS has no DL data for the MS, and the BS is not aware of that the MS has UL data packet 1023 ready for transmission. Interval 1001 represents the active mode for the MS. Intervals 1003, 1007, 1011, 1017, and 1021 represent sleep intervals, and intervals 1005, 1009, 1013, 1015, and 1019 represent available intervals. In this embodiment, after sleep interval 1003, the MS receives an MOB_TRF_IND( ) message with an indicator having the first value at available interval 1005. Because the first value indicates to the MS that there is no DL traffic, the MS doubles the length of sleep interval 1007 in the next DRX cycle. After sleep interval 1007, the MS again receives an MOB_TRF_IND( ) with the first value and again doubles the length of sleep interval 1011 in the next DRX cycle.

During sleep interval 1011, the MS has UL data ready for transmission and takes the initiative. First, the MS decides to set the next DRX cycle minus the FLI to half of the previous DRX cycle minus the FLI. The MS also sets an appropriate portion of the DRX cycle as an available interval for data traffic. Second, the MS transmits a bandwidth request (BR) message to the BS during available interval 1013 even though it received an MOB_TRF_IND(00) message. Having received the BR message, the BS is informed of the MS intention for UL transmission. The MS then transmits the UL data during available interval 1015. The MS will automatically enter into sleep mode if the MS has successfully transmitted the data to the BS before the end of the current DRX cycle. If the MS still has UL data ready for transmission at the end of the current DRX cycle, the MS transmits the remaining UL data during the next DRX cycle.

Figure 11:
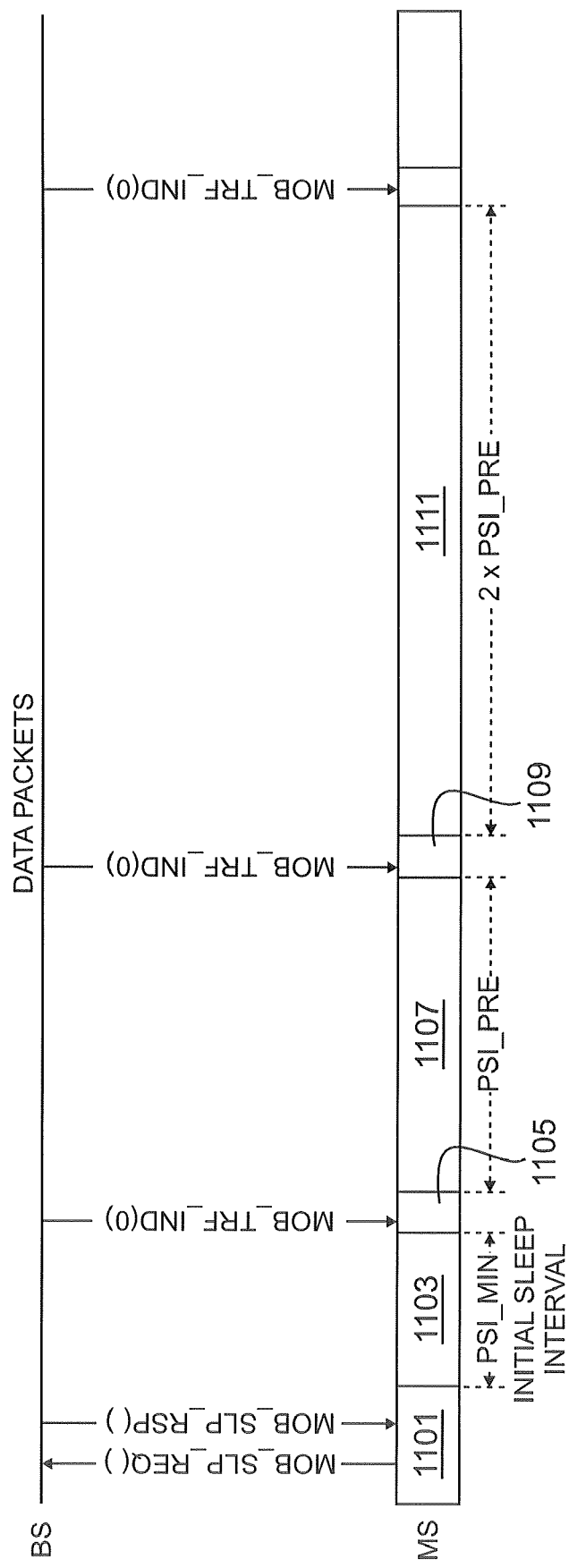
FIG. 11 illustrates discontinuous reception (DRX) cycles when there is no DL or UL data traffic ready for transmission at the beginning of a DRX cycle according to an embodiment of the present disclosure.

FIG. 11 illustrates discontinuous reception (DRX) cycles when there is no DL or UL data traffic ready for transmission at the beginning of a DRX cycle according to an embodiment of the present disclosure.

As shown in FIG. 11, interval 1101 represents the active mode for the MS. Intervals 1103, 1107, and 1111 represent sleep intervals, and intervals 1105 and 1109 represent available intervals. After sleep interval 1103, the MS receives an MOB_TRF_IND( ) message with an indicator having a first value indicating that there is no DL traffic ready for transmission from the BS. In this embodiment, the indicator is a one-bit value "0". Because there is no UL traffic ready for transmission from the MS, the MS remains in sleep mode, and both the BS and the MS automatically set the length of the next PSI to be twice of that of the previous PSI (i.e., sleep interval 1107 is set to be twice that of the previous sleep interval 1103). After sleep interval 1107, the MS again receives an MOB_TRF_IND( ) message with an indicator having the first value indicating that there is no DL traffic ready for transmission from the BS. Because there is no UL traffic ready for transmission from the MS, the MS remains in sleep mode, and again both the BS and the MS automatically set the length of next PSI to be twice of that of the previous PSI (i.e., the next sleep interval 1111 is set to be twice that of the previous sleep interval 1107).

Therefore, not only is the length of the sleep interval extended according to the light MS traffic pattern and activity level, but also the length of the sleep interval is synchronized between the BS and the MS without explicit signaling.

Figure 12:
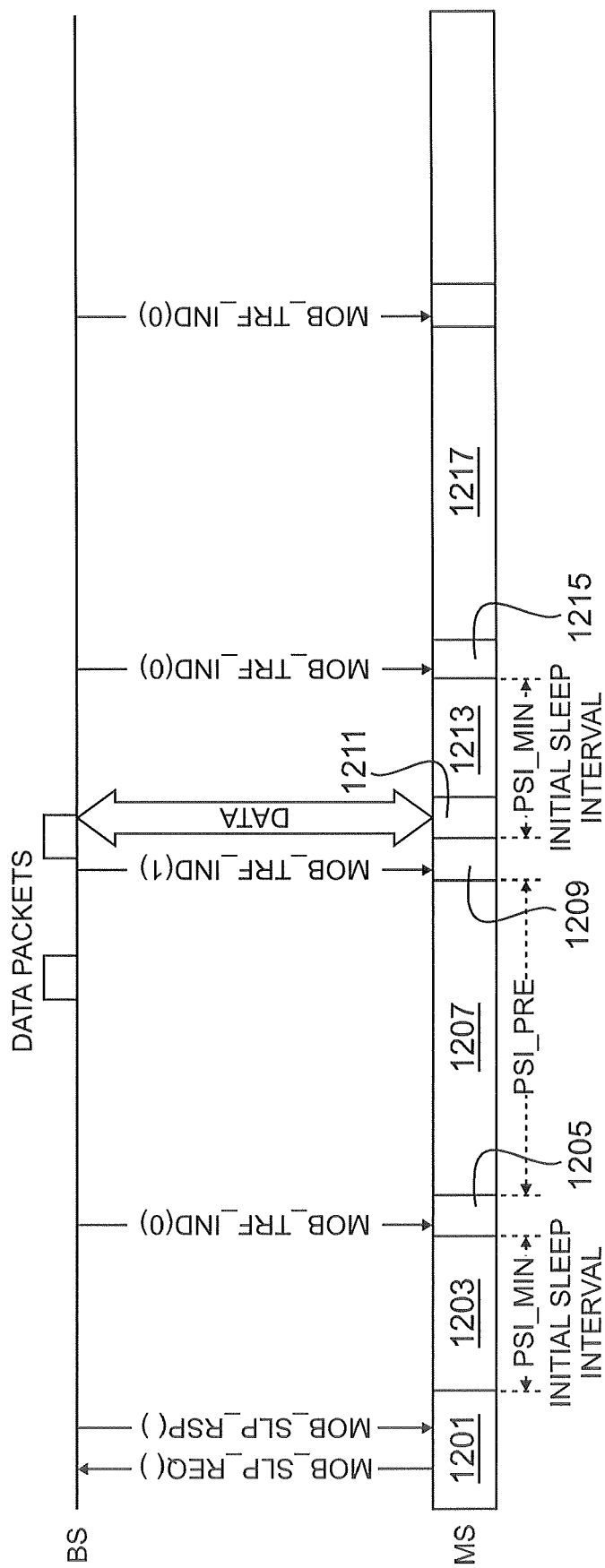
FIG. 12 illustrates discontinuous reception (DRX) cycles when there is DL data traffic but no UL data traffic ready for transmission at the beginning of a DRX cycle according to an embodiment of the present disclosure.

FIG. 12 illustrates discontinuous reception (DRX) cycles when there is DL data traffic but no UL data traffic ready for transmission at the beginning of a DRX cycle according to an embodiment of the present disclosure.

As shown in FIG. 12, interval 1201 represents the active mode for the MS. Intervals 1203, 1207, 1213, and 1217 represent sleep intervals, and intervals 1205, 1209, 1211, and 1215 represent available intervals. After sleep interval 1203, the MS receives an MOB_TRF_IND( ) message with an indicator having the first value indicating that there is no DL traffic ready for transmission from the BS. Because there is no UL traffic ready for transmission from the MS, the MS remains in sleep mode, and both the BS and the MS automatically set the length of the next PSI to be twice that of the previous PSI (i.e., the next sleep interval 1207 is set to be twice that of the previous sleep interval 1203). After sleep interval 1207, the MS receives an MOB_TRF_IND( ) message with an indicator having a second value indicating that there is DL traffic ready for transmission from the BS. In this embodiment, the indicator is a one-bit value "1". Although there is DL traffic ready for transmission from the BS, the MS remains in sleep mode, and both the BS and the MS automatically set the length of the next PSI to be the minimum PSI. ELI can be extended upon a request for data transmission from the BS or a response from the MS. In this case, the available interval 1209 was extended by available interval 1211. ELI could be extended to the end of the current DRX cycle.

Accordingly, the length of the pseudo sleep interval is set to the initial (i.e., minimum) PSI length according to the presence of DL traffic and activity level, and the DRX cycle is synchronized between the BS and the MS without explicit signaling.

Figure 13:
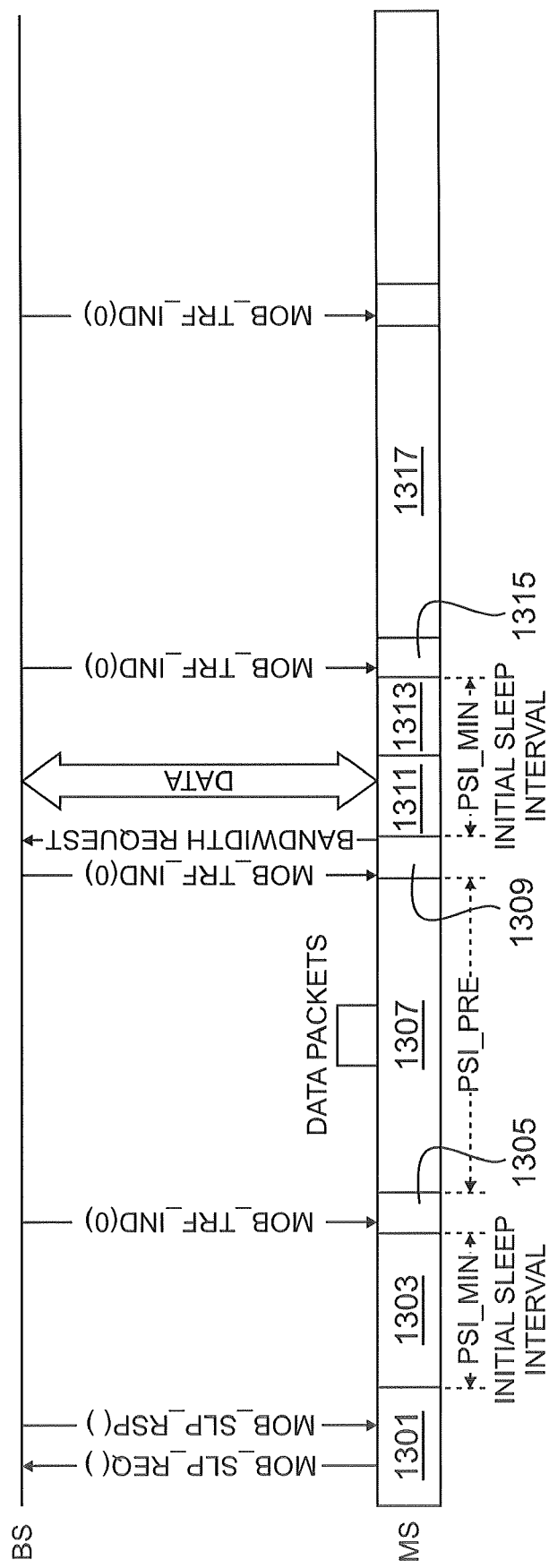
FIG. 13 illustrates discontinuous reception (DRX) cycles when there is UL data traffic but no DL data traffic ready for transmission at the beginning of a DRX cycle according to an embodiment of the present disclosure.

FIG. 13 illustrates discontinuous reception (DRX) cycles when there is UL data traffic but no DL data traffic ready for transmission at the beginning of a DRX cycle according to an embodiment of the present disclosure.

As shown in FIG. 13, interval 1301 represents the active mode for the MS. Intervals 1303, 1307, 1313, and 1317 represent sleep intervals, and intervals 1305, 1309, 1311, and 1315 represent available intervals. After sleep interval 1303, the MS receives an MOB_TRF_IND( ) message indicating that there is no DL traffic ready for transmission from the BS. Because there is no UL traffic ready for transmission from the MS, the MS remains in sleep mode, and both the BS and the MS automatically set the length of the next PSI to be twice that of the previous PSI (i.e., the next sleep interval 1307 is set to be twice that of the previous sleep interval 1303). During sleep interval 1307, the MS has UL data ready for transmission to the BS. Although the MS receives an MOB_TRF_IND( ) message after sleep interval 1307 indicating that there is no DL traffic, the MS remains in sleep mode and transmits a bandwidth request message during available interval 1309 indicating that there is UL traffic ready for transmission. Because there is UL data ready for transmission, both the BS and the MS automatically set the length of the next PSI to be the minimum PSI. ELI can be extended upon a request for data transmission from the BS or a response from the MS. In this case, the available interval 1309 was extended by available interval 1311. ELI could be extended to the end of the current DRX cycle.

Accordingly, the length of the pseudo sleep-interval is set to the minimum PSI length according to the presence of UL traffic and activity level, and the DRX cycle is synchronized between the BS and the MS without explicit signaling.

Figure 14:
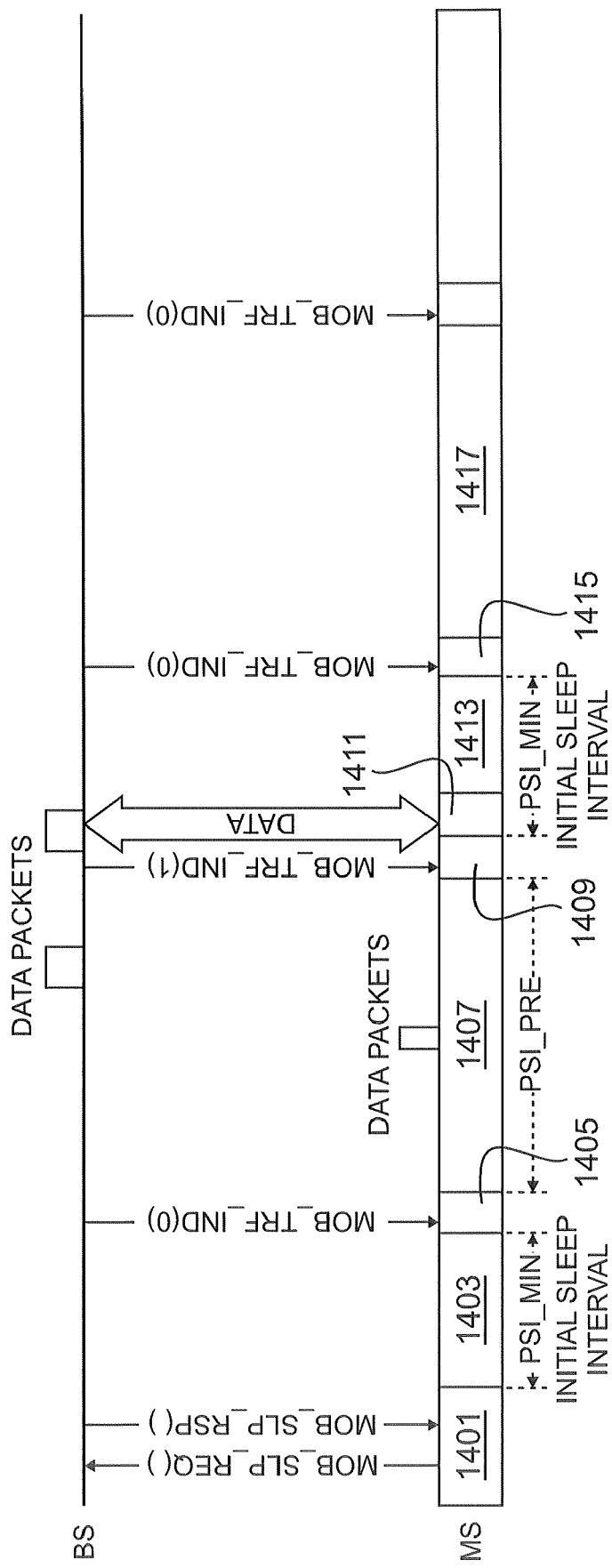
FIG. 14 illustrates discontinuous reception (DRX) cycles when there is DL and UL data traffic ready for transmission at the beginning of a DRX cycle according to an embodiment of the present disclosure.

FIG. 14 illustrates discontinuous reception (DRX) cycles when there is DL and UL data traffic ready for transmission at the beginning of a DRX cycle according to an embodiment of the present disclosure.

As shown in FIG. 14, interval 1401 represents the active mode for the MS. Intervals 1403, 1407, 1413, and 1417 represent sleep intervals, and intervals 1405, 1409, 1411, and 1415 represent available intervals. After sleep interval 1403, the MS receives an MOB_TRF_IND( ) message indicating that there is no DL traffic ready for transmission from the BS. Because there is no UL traffic ready for transmission from the MS, the MS remains in sleep mode, and both the BS and the MS automatically set the length of the next PSI to be twice that of the previous PSI (i.e., the next sleep interval 1407 is set to be twice that of the previous sleep interval 1403). During sleep interval 1407, the MS has UL data ready for transmission to the BS and receives an MOB_TRF_IND( ) message after sleep interval 1407 indicating that there is DL traffic. In some embodiments, the MS could piggyback a bandwidth request with the ACK/NACK message. Because there is DL and UL data ready for transmission, both the BS and the MS automatically set the length of the next PSI to be the minimum PSI. ELI can be extended upon a request for data transmission from the BS or a response from the MS. In this case, the available interval 1409 was extended by available interval 1411. ELI could be extended to the end of the current DRX cycle.

Accordingly, the length of the pseudo sleep interval is set to the minimum PSI according to the presence of DL and UL traffic and activity level, and the DRX cycle is synchronized between the BS and the MS without explicit signaling.

Figure 15:
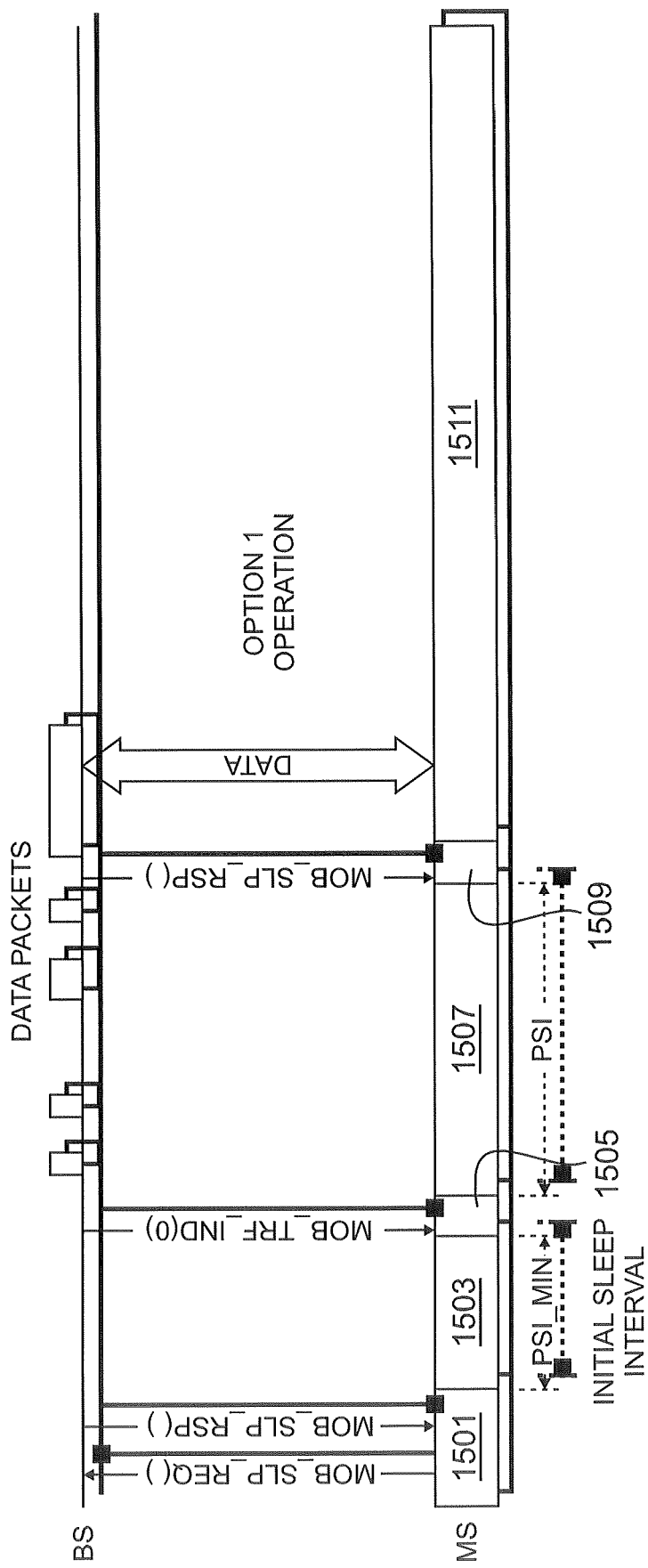
FIG. 15 illustrates discontinuous reception (DRX) cycles where an explicit signaling exchange is used to terminate sleep mode according to an embodiment of the present disclosure.

FIG. 15 illustrates discontinuous reception (DRX) cycles where an explicit signaling exchange is used to terminate sleep mode according to an embodiment of the present disclosure.

As shown in FIG. 15, intervals 1501 and 1511 represent the active mode for the MS. Intervals 1503 and 1507 represent sleep intervals, and intervals 1505 and 1509 represent available intervals. After sleep interval 1503, the MS receives an MOB_TRF_IND( ) message indicating that there is no DL traffic ready for transmission from the BS. Because there is no UL traffic ready for transmission from the MS, the MS remains in sleep mode, and both the BS and the MS automatically set the length of the next PSI to be twice that of the previous PSI (i.e., the next sleep interval 1507 is set to be twice that of the previous sleep interval 1503). During sleep interval 1507, the BS receives DL data ready for transmission to the MS and transmits an MOB_SLP_RSP( ) message at interval 1509. Upon receiving the MOB_SLP_RSP( ) message, the MS terminates sleep mode at interval 1511 and receives the DL data transmission.

Accordingly, the MS returns to active mode through an unsolicited signaling exchange with the BS.

Figure 16:
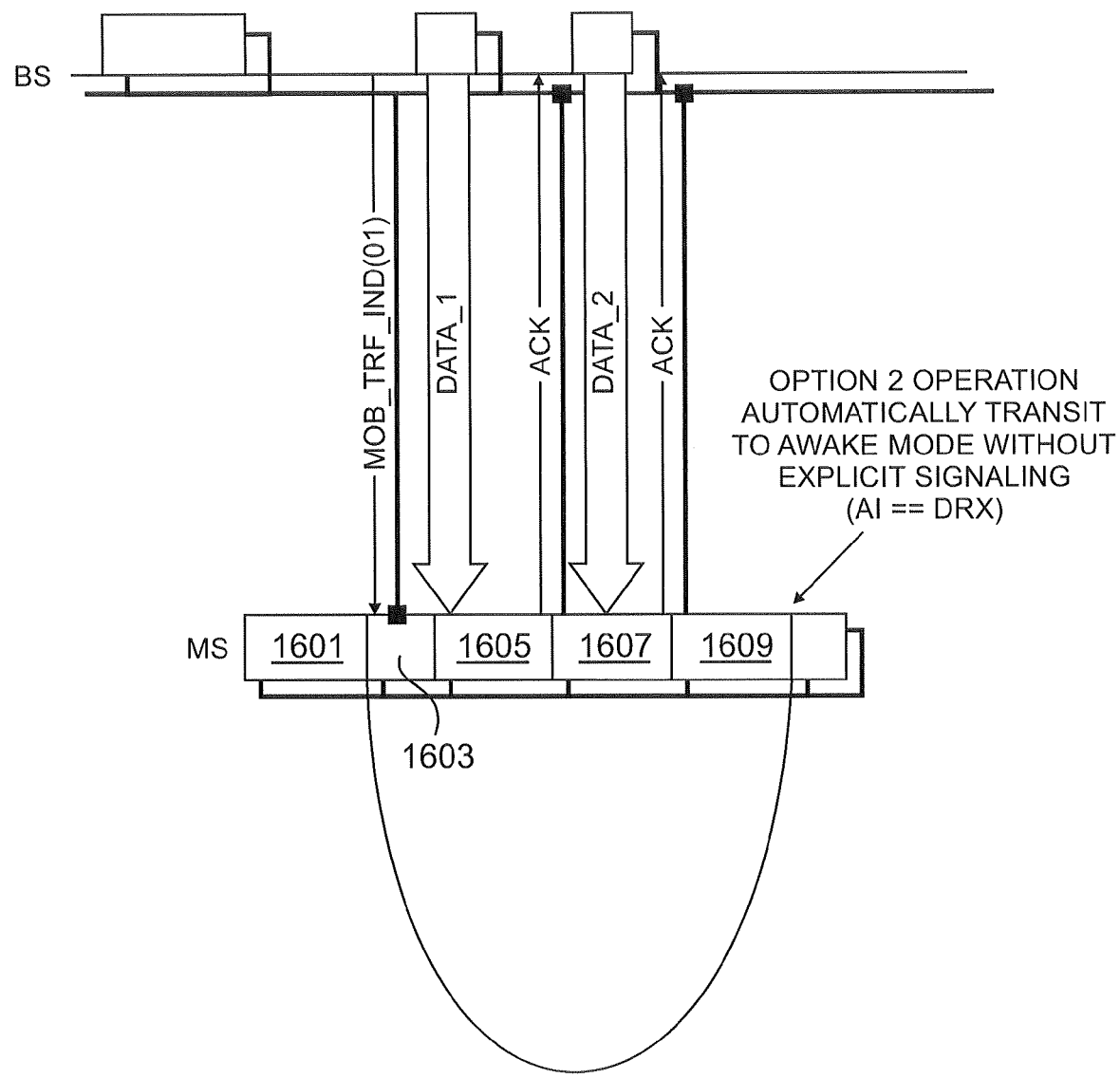
FIG. 16 illustrates discontinuous reception (DRX) cycles where a mobile station automatically transitions from sleep mode to active mode when an available interval is extended to the end of a DRX cycle without explicit signaling according to an embodiment of the present disclosure.

FIG. 16 illustrates discontinuous reception (DRX) cycles where a mobile station automatically transitions from sleep mode to active mode when an available interval is extended to the end of a DRX cycle without explicit signaling according to an embodiment of the present disclosure.

As shown in FIG. 16, interval 1601 represents a sleep interval, and intervals 1603 to 1609 represent available intervals. Because of the DL data traffic, the available interval extends to the end of the current DRX cycle. Once the available interval extends to the end of the current DRX cycle, the MS automatically transitions from sleep mode to active mode. There is no need for an explicit signaling exchange because both the MS and the BS are aware that this parameter triggers the MS to transition from sleep mode to active mode.

Accordingly, the MS automatically transitions from sleep mode to active mode when the available interval extends to the end of the current DRX cycle in the absence of an explicit signaling exchange.

Figure 17:
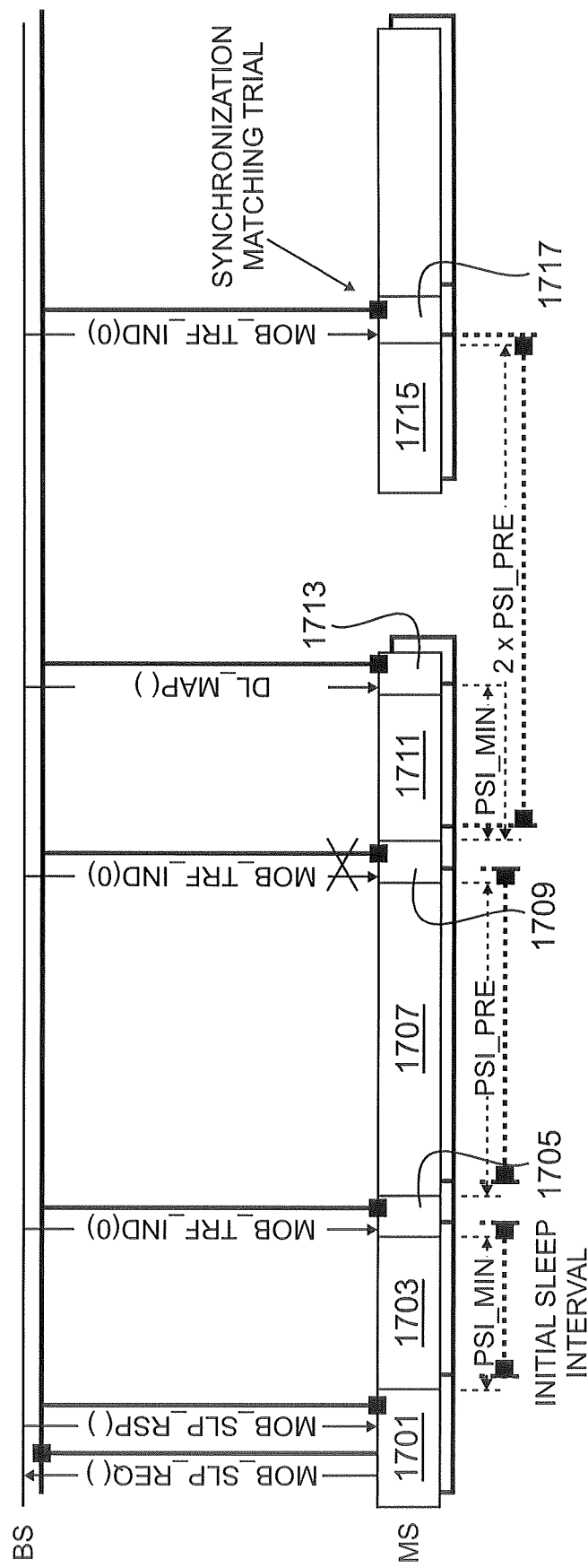
FIG. 17 illustrates a method for re-synchronizing a mobile station with a base station after an MOB_TRF_IND(0) message is lost according to an embodiment of the present disclosure.

FIG. 17 illustrates a method for re-synchronizing a mobile station with a base station after an MOB_TRF_IND(0) message is lost according to an embodiment of the present disclosure.

As shown in FIG. 17, interval 1701 represents the active mode for the MS. Intervals 1703, 1707, 1711, and 1715 represent sleep intervals, and intervals 1705, 1709, 1713, and 1717 represent available intervals. After sleep interval 1703, the MS receives an MOB_TRF_IND(0) message indicating that there is no DL traffic ready for transmission from the BS. Because there is no UL traffic ready for transmission from the MS, the MS remains in sleep mode, and both the BS and the MS automatically set the length of the next PSI to be twice that of the previous PSI (i.e., the next sleep interval 1707 is set to be twice that of the previous sleep interval 1703).

At interval 1709, the MS marks the FailTime and re-sets the current PSI to PSI_min (i.e., sleep interval 1711 is set to PSI_min) because the MS did not receive the MOB_TRF_IND(0) message transmitted during interval 1709. However, because the BS transmitted an MOB_TRF_IND(0) message at interval 1709, the BS proceeds to increase its PSI to 2×PSI_pre. At this point, the BS and the MS are out of synch with one another. The MS then makes Rms retrials assuming PSI_min each time.

If the MS gets an MOB_TRF-IND(0) message or a DL-MAP( ) message with no MOB_TRF-IND( ) message during any of the Rms retrials, the MS knows that the MS has missed an MOB_TRF-IND(0) message at the FailTime, and tries to re-synch with the BS using a PSI that is 2×PSI_pre from the FailTime. In this figure, the MS receives a DL-MAP( ) message with no MOB_TRF-IND( ) message at interval 1713. Re-synchronization is achieved at the next FLI that is 2×PSI_pre from the FailTime without an explicit signaling exchange with the BS. In the embodiment shown in FIG. 17, re-synchronization is achieved at interval 1717.

Figure 18:
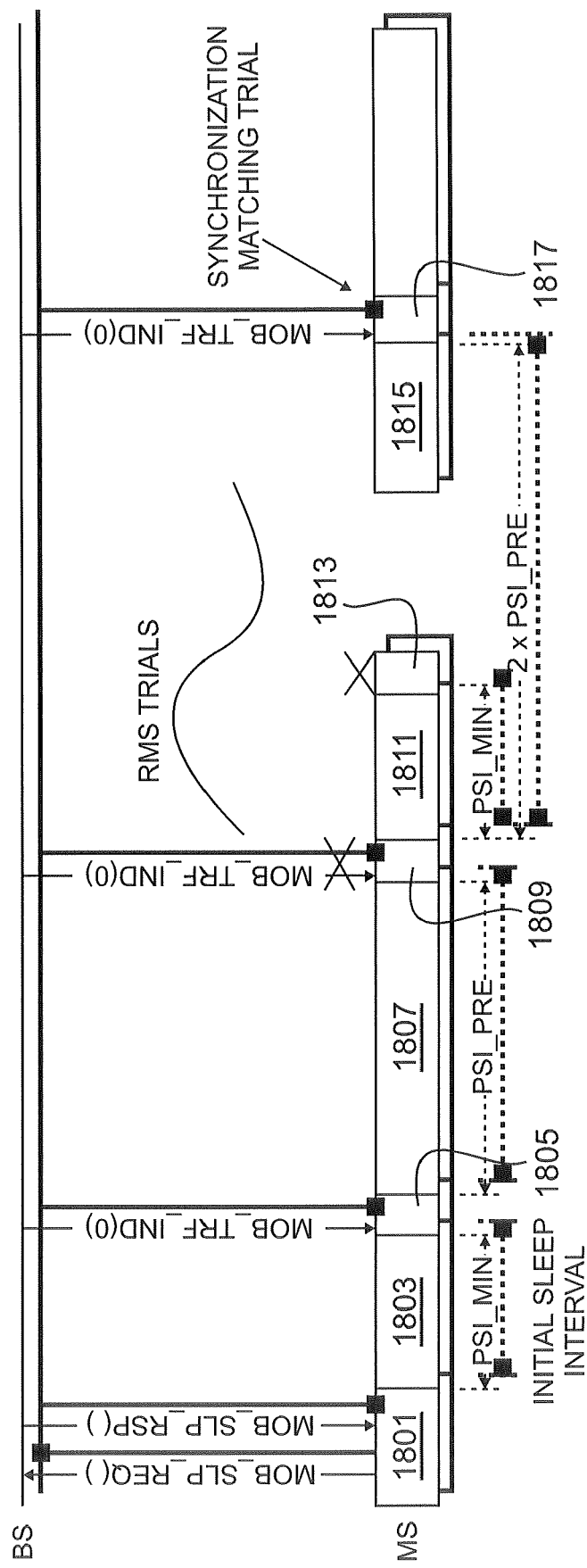
FIG. 18 illustrates a method for re-synchronizing a mobile station with a base station after an MOB_TRF_IND(0) message is lost according to another embodiment of the present disclosure.

FIG. 18 illustrates a method for re-synchronizing a mobile station with a base station after an MOB_TRF_IND(0) message is lost according to another embodiment of the present disclosure.

As shown in FIG. 18, interval 1801 represents the active mode for the MS. Intervals 1803, 1807, 1811, and 1815 represent sleep intervals, and intervals 1805, 1809, 1813, and 1817 represent available intervals. After sleep interval 1803, the MS receives an MOB_TRF_IND(0) message indicating that there is no DL traffic ready for transmission from the BS.

Because there is no UL traffic ready for transmission from the MS, the MS remains in sleep mode, and both the BS and the MS automatically set the length of the next PSI to be twice that of the previous PSI (i.e., the next sleep interval 1807 is set to be twice that of the previous sleep interval 1803).

At interval 1809, the MS marks the FailTime and re-sets the current PSI to PSI_min (i.e., sleep interval 1811 is set to PSI_min) because the MS did not receive the MOB_TRF_IND(0) message transmitted during interval 1809. However, because the BS transmitted an MOB_TRF_IND(0) message at interval 1809, the BS proceeds to increase its PSI to 2×PSI_pre. At this point, the BS and the MS are out of synch with one another. The MS then makes Rms retrials assuming PSI_min each time.

As shown in FIG. 18, all the Rms retrials fail (which means the MS lost the MOB_TRF-IND( ) message in all those re-trials), and the MS attempts the last trial assuming the PSI is 2×PSI_pre. Thus, re-synchronization is achieved at the last trial of the MS without an explicit signaling exchange with the BS. In the embodiment shown in FIG. 18, re-synchronization is achieved at interval 1817.

Figure 19:
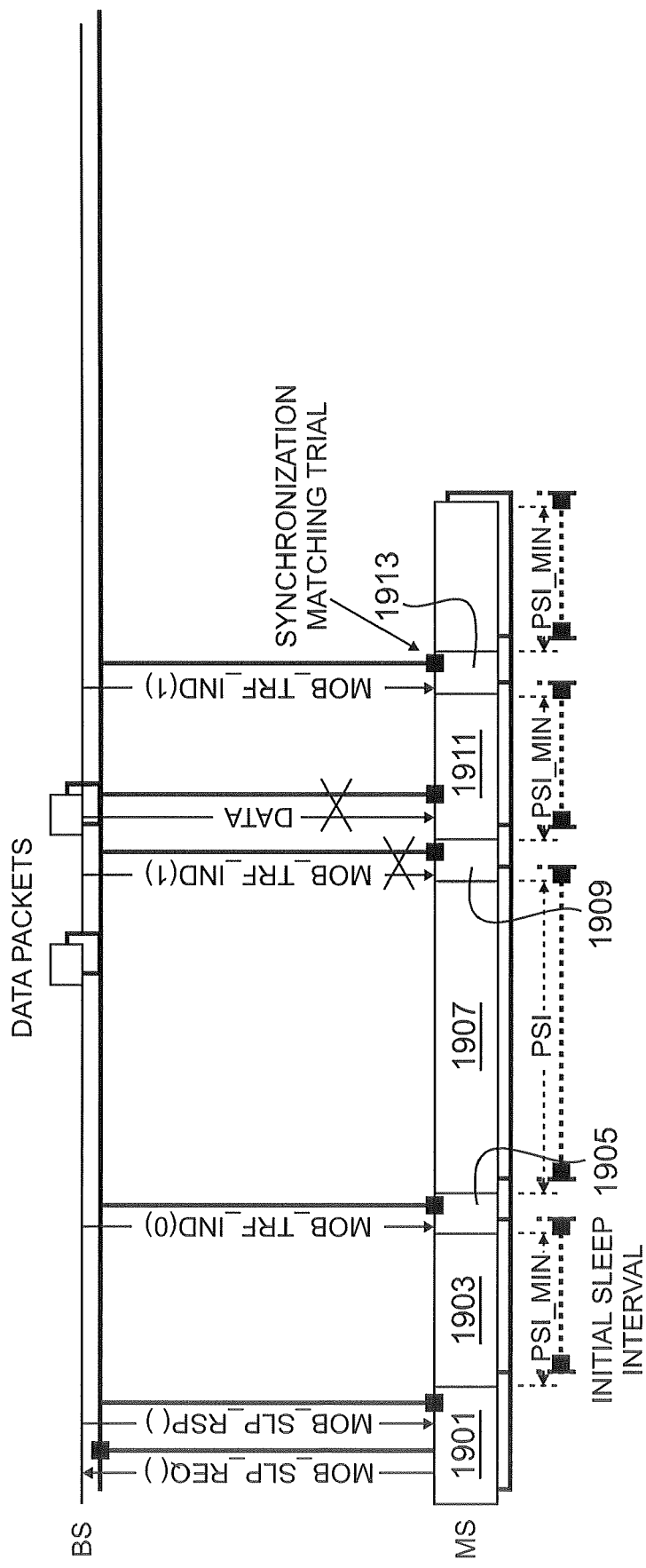
FIG. 19 illustrates a method for re-synchronizing a mobile station with a base station after an MOB_TRF_IND(1) message is lost according to an embodiment of the present disclosure.

FIG. 19 illustrates a method for re-synchronizing a mobile station with a base station after an MOB_TRF_IND(1) message is lost according to an embodiment of the present disclosure.

As shown in FIG. 19, interval 1901 represents the active mode for the MS. Intervals 1903, 1907, and 1911 represent sleep intervals, and intervals 1905, 1909, and 1913 represent available intervals. After sleep interval 1903, the MS receives an MOB_TRF_IND(0) message indicating that there is no DL traffic ready for transmission from the BS. Because there is no UL traffic ready for transmission from the MS, the MS remains in sleep mode, and both the BS and the MS automatically set the length of the next PSI to be twice that of the previous PSI (i.e., the next sleep interval 1907 is set to be twice that of the previous sleep interval 1903).

The BS receives DL data ready for transmission during interval 1907 and transmits an MOB_TRF_IND(1) message at interval 1909. However, at interval 1909, the MS marks the FailTime and re-sets the current PSI to PSI_min (i.e., sleep interval 1911 is set to PSI_min) because the MS did not receive the MOB_TRF_IND(1) message transmitted during interval 1909. Because the BS failed to receive an acknowledgment regarding the MOB_TRF_IND(1) message, the BS also proceeds to re-set the current PSI to PSI_min. Accordingly, synchronization is achieved at the next DRX cycle without an explicit signaling exchange with the BS. In the embodiment shown in FIG. 19, re-synchronization is achieved at interval 1913.

Figure 20:
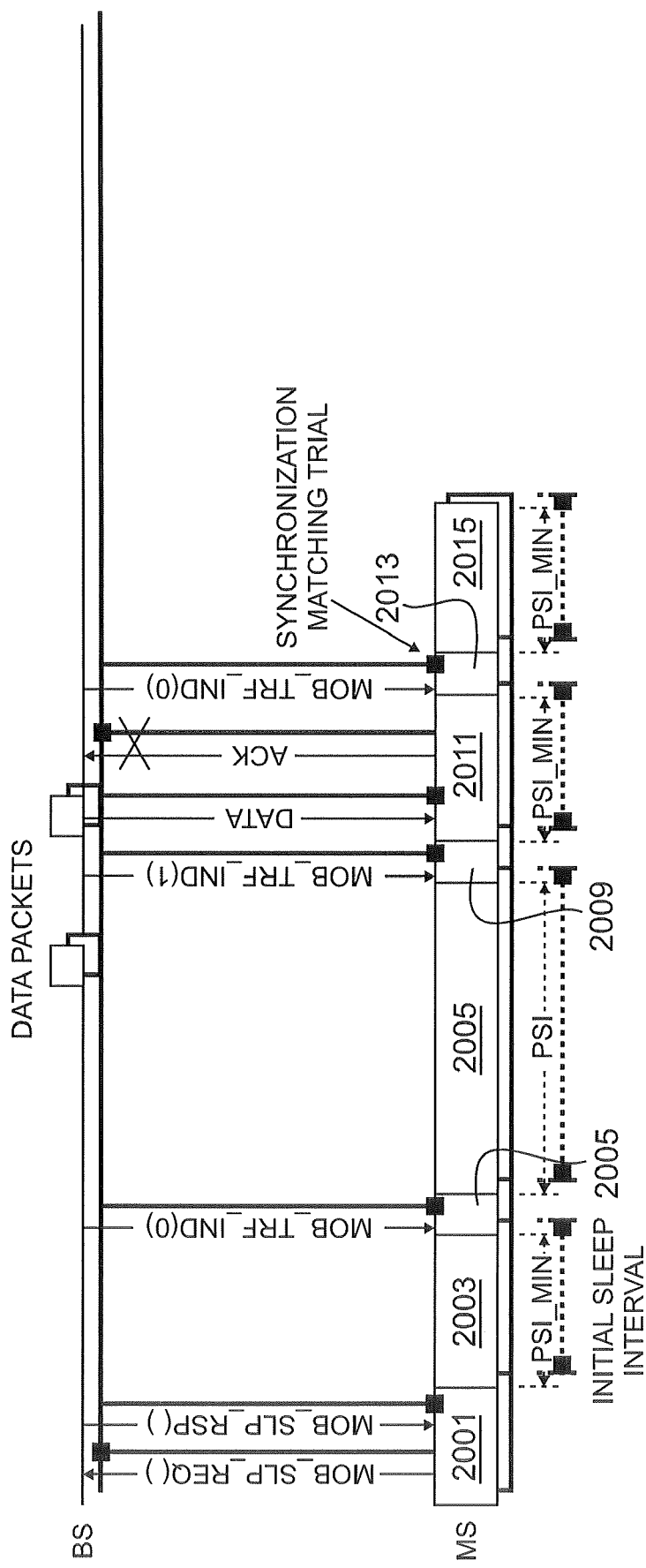
FIG. 20 illustrates a method for re-synchronizing a mobile station with a base station after an MOB_TRF_IND(1) message is received but the acknowledgment is lost according to an embodiment of the present disclosure.

FIG. 20 illustrates a method for re-synchronizing a mobile station with a base station after an MOB_TRF_IND(1) message is received but the acknowledgment is lost according to an embodiment of the present disclosure.

As shown in FIG. 20, interval 2001 represents the active mode for the MS. Intervals 2003, 2005, and 2013 represent sleep intervals, and intervals 2005, 2009, 2011, and 2015 represent available intervals. After sleep interval 2003, the MS receives an MOB_TRF_IND(0) message indicating that there is no DL traffic ready for transmission from the BS. Because there is no UL traffic ready for transmission from the MS, the MS remains in sleep mode, and both the BS and the MS automatically set the length of the next PSI to be twice that of the previous PSI (i.e., the next sleep interval 2005 is set to be twice that of the previous sleep interval 2003).

The BS receives DL data ready for transmission during interval 2005 and transmits an MOB_TRF_IND(1) message and data at interval 2009. At interval 2011, the MS transmits an ACK message that is not received by the BS. The MS proceeds to re-set the current PSI to PSI_min in response to the MOB_TRF_IND(1) message. Because the BS failed to receive an acknowledgment regarding the MOB_TRF_IND (1) message, the BS also proceeds to re-set the current PSI to PSI_min. This allows synchronization to be achieved at the next DRX cycle without an explicit signaling exchange with the BS. In the embodiment shown in FIG. 20, re-synchronization is achieved at interval 2015.

Figure 21:
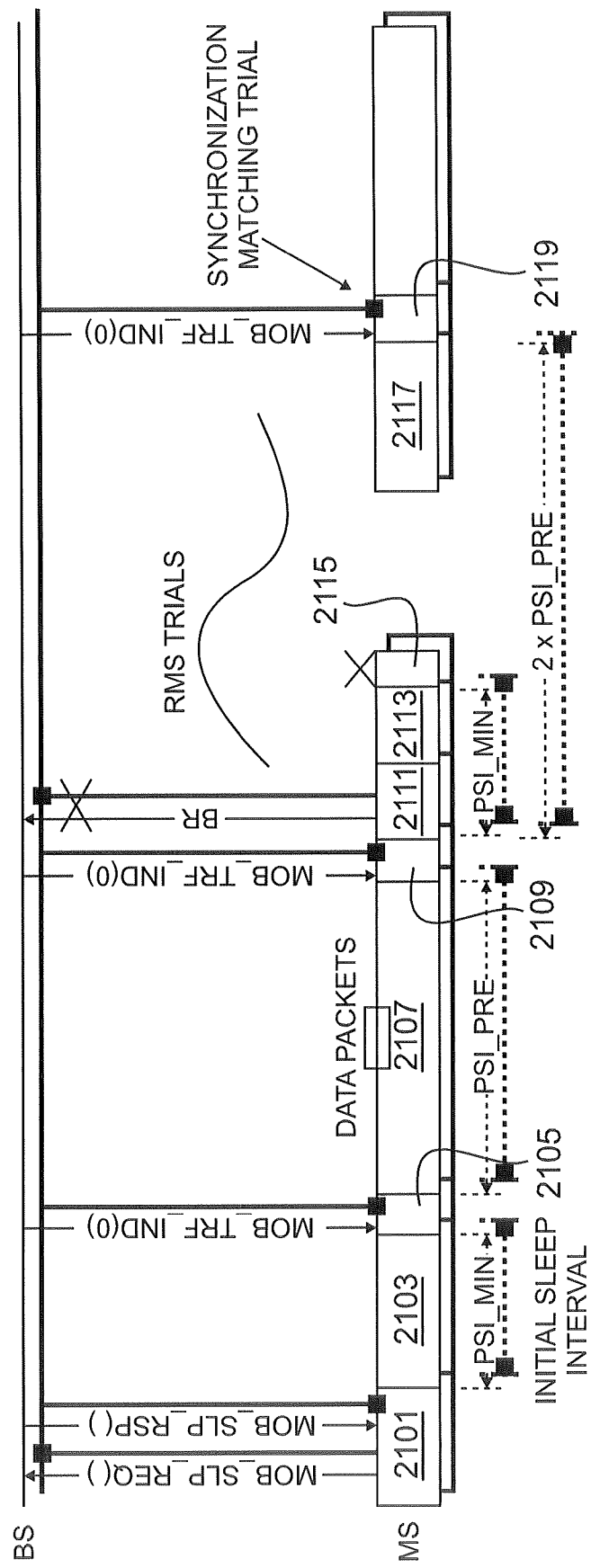
FIG. 21 illustrates a method for re-synchronizing a mobile station with a base station after an MOB_TRF_IND(0) message is received and a bandwidth request message is lost according to an embodiment of the present disclosure.

FIG. 21 illustrates a method for re-synchronizing a mobile station with a base station after an MOB_TRF_IND(0) message is received and a bandwidth request message is lost according to an embodiment of the present disclosure.

As shown in FIG. 21, interval 2101 represents the active mode for the MS. Intervals 2103, 2107, 2113, and 2117 represent sleep intervals, and intervals 2105, 2109, 2111, 2115 and 2119 represent available intervals. After sleep interval 2103, the MS receives an MOB_TRF_IND(0) message indicating that there is no DL traffic ready for transmission from the BS. Because there is no UL traffic ready for transmission from the MS, the MS remains in sleep mode, and both the BS and the MS automatically set the length of the next PSI to be twice that of the previous PSI (i.e., the next sleep interval 2107 is set to be twice that of the previous sleep interval 2103).

At interval 2109, the MS receives another MOB_TRF_IND(0) message indicating that there is no DL traffic ready for transmission from the BS. Because the MS receives UL data ready for transmission during interval 2107, the MS transmits a bandwidth request message after receiving the MOB_TRF_IND(0) message. However, the bandwidth request message is lost. Accordingly, the MS re-sets the current PSI to PSI_min because the MS has UL data ready for transmission. Conversely, the BS increases the current PSI to 2×PSI_pre because there is no DL data ready for transmission and because the BS did not receive bandwidth request message. At this point, the BS and the MS are out of synch with one another. The MS then makes Rms retrials assuming PSI_min each time.

As shown in FIG. 21, all the Rms retrials fail, and the MS attempts the last trial assuming the PSI is 2×PSI_pre. Thus, re-synchronization is achieved at the last trial of the MS without an explicit signaling exchange with the BS. In the embodiment shown in FIG. 21, re-synchronization is achieved at interval 2119.

Figure 22:
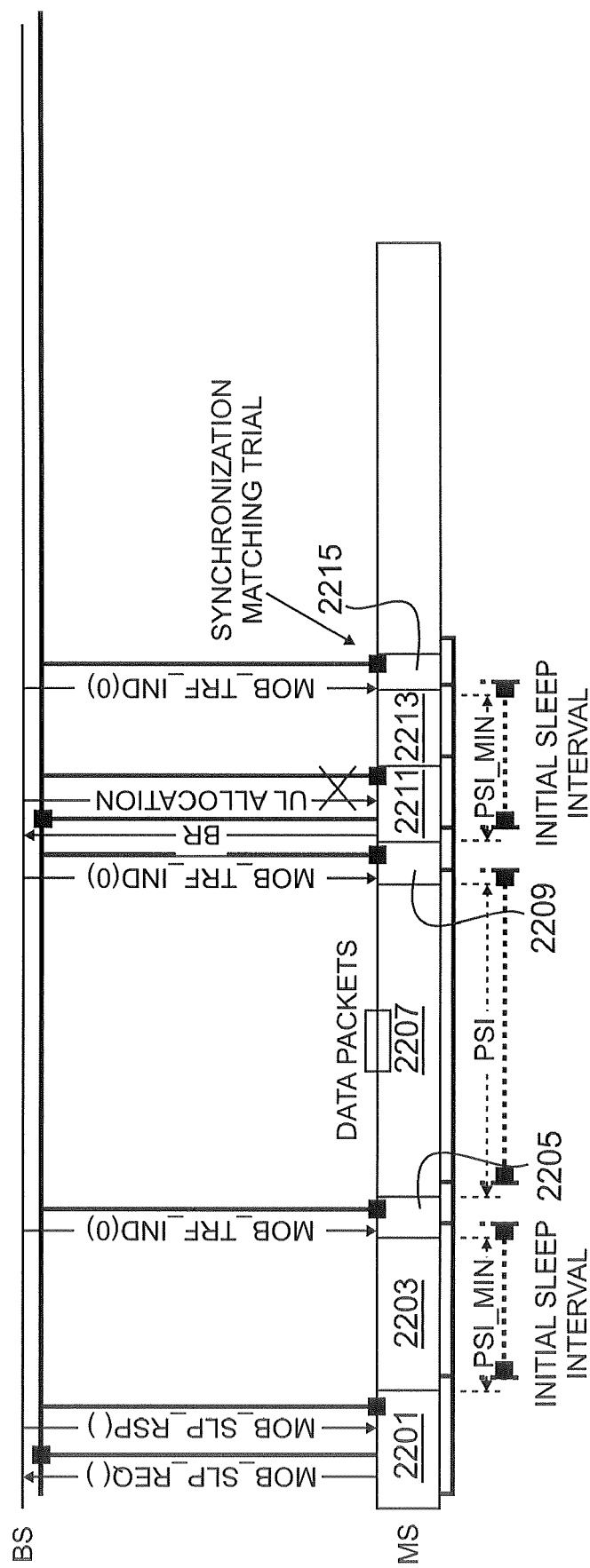
FIG. 22 illustrates a method for re-synchronizing a mobile station with a base station after an MOB_TRF_IND(0) message and a bandwidth request message are received, and the UL allocation is lost or there is no UL allocation according to an embodiment of the present disclosure.

FIG. 22 illustrates a method for re-synchronizing a mobile station with a base station after an MOB_TRF_IND(0) message and a bandwidth request message are received, and the UL allocation is lost or there is no UL allocation according to an embodiment of the present disclosure.

As shown in FIG. 22, interval 2201 represents the active mode for the MS. Intervals 2203, 2207, and 2213 represent sleep intervals, and intervals 2205, 2209, 2211, and 2215 represent available intervals. After sleep interval 2203, the MS receives an MOB_TRF_IND(0) message indicating that there is no DL traffic ready for transmission from the BS. Because there is no UL traffic ready for transmission from the MS, the MS remains in sleep mode, and both the BS and the MS automatically set the length of the next PSI to be twice that of the previous PSI (i.e., the next sleep interval 2207 is set to be twice that of the previous sleep interval 2203).

At interval 2209, the MS receives another MOB_TRF_IND(0) message indicating that there is no DL traffic ready for transmission from the BS. Because the MS receives UL data ready for transmission during interval 2207, the MS transmits a bandwidth request message after receiving the MOB_TRF_IND(0) message. In response to the bandwidth request message, the BS transmits a message indicating the UL resources allocated to the MS. However, the UL allocation message is lost. Accordingly, the MS re-sets the current PSI to PSI_min because the MS has UL data ready for transmission. The BS also re-sets the current PSI to PSI_min upon receiving the bandwidth request message. Accordingly, although the UL allocation message is lost, synchronization is achieved at the next DRX cycle without an explicit signaling exchange with the BS. In the embodiment shown in FIG. 22, re-synchronization is achieved at interval 2215.

In some embodiments, Rbs and Rms for re-trial at the BS and the MS, respectively, can be negotiated during the initialization of sleep mode operation using an MOB_SLP-REQ/RSP message.

Figure 23:
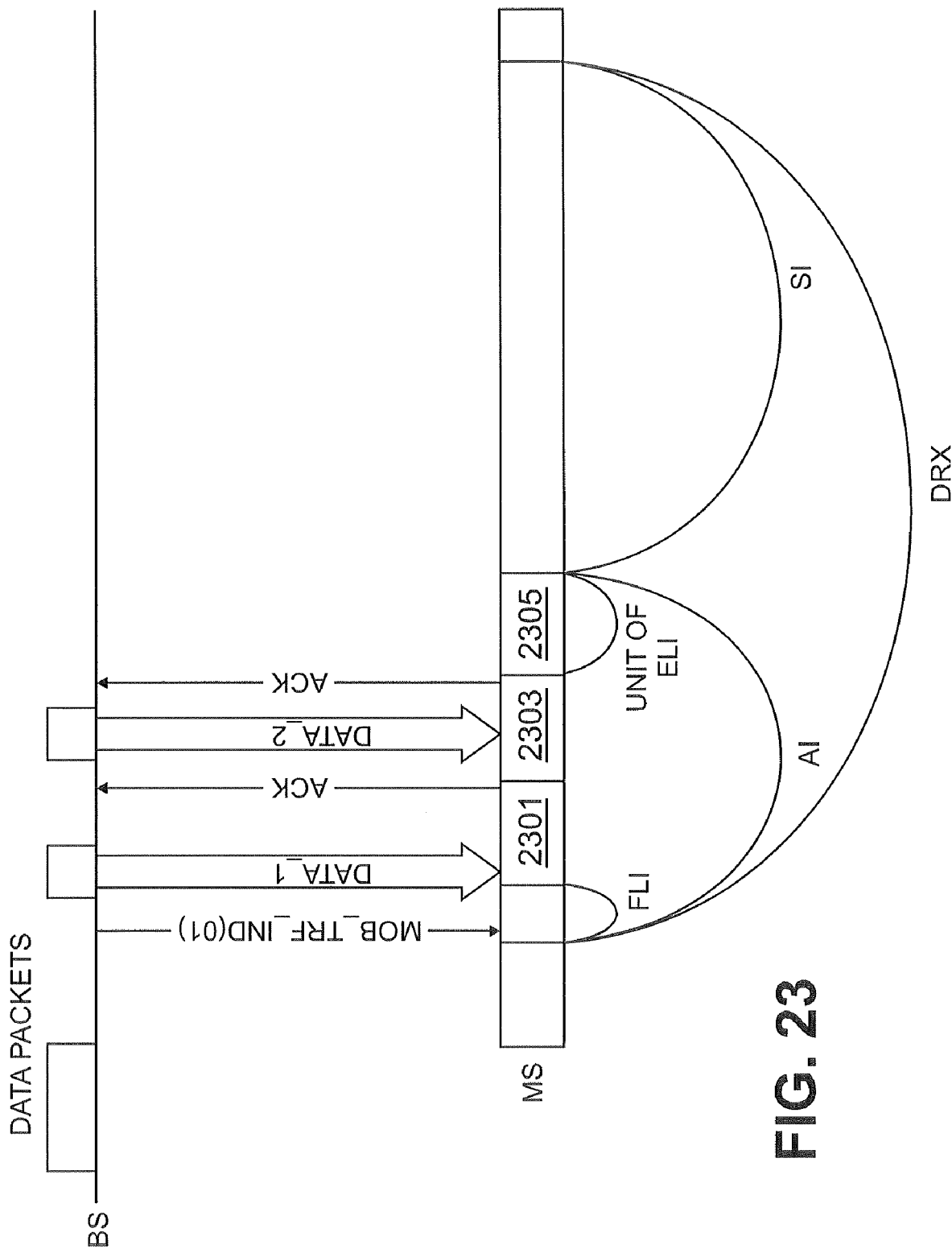
FIG. 23 illustrates a DRX cycle in which the length of the available interval dependent upon the DL and UL traffic according to an embodiment of the present disclosure.

FIG. 23 illustrates a DRX cycle in which the length of the available interval dependent upon the DL and UL traffic according to an embodiment of the present disclosure.

In this embodiment, the length of AI is dependent on the DL/UL traffic. As shown in FIG. 23, having received a data packet during interval 2301, the MS waits a predefined waiting interval (e.g., 1 unit of ELI) in case the BS transmits another data packet to the MS. The length of waiting period can be negotiated before the MS enters sleep mode using, for example, an MOB_SLP-REQ/RSP message. In this embodiment, the MS receives another data packet during interval 2303. Therefore, the MS waits another predefined waiting interval 2305. Because no data packets were received during the waiting interval 2305, the MS automatically enters sleep mode if the current DRX cycle has not finished yet.

In some embodiments, AI and ELI can reach up to end of DRX cycle. In which case, there is no sleep interval in the DRX cycle, and the MS can automatically go to awake mode or continue the sleep mode operation, based on the negotiation with the BS before entering sleep mode. This allows the sleep mode to be terminated without an explicit exchange of management messages. The BS can also terminate sleep mode by sending an unsolicited MOB_SLP_RSP( ) message at the next fixed listening interval (FLI).

In some embodiments, two additional methods for deciding the length of the available interval within a DRX cycle may be used. With the first method, when a certain waiting period is predetermined between the BS and MS, the MS waits the predetermined waiting period in case the BS transmits another packet during the predetermined waiting period. If there is no packet during the last waiting period, the MS enters into sleep mode automatically. With the second method, the length of AI is either pre-determined between the BS and MS before the MS enters into sleep mode, or the BS informs the MS the length of the AI each time through a certain message at the beginning of a DRX cycle together with the 2-bit TRF-IND indicator. Either way, the MS will keep awake in the AI and enter into sleep after this AI.

AI can reach up to the end of DRX cycle (i.e., no sleep interval in this DRX cycle). If there is a high volume of data that is to be immediately transmitted to the MS, the BS can signal the MS at the next listening interval (FLI), using an MOB_TRF-IND (11) message in order to bring the MS back to normal mode. Another option is for the MS to go back to the normal mode automatically when AI reaches the end of DRX cycle.

Figure 24:
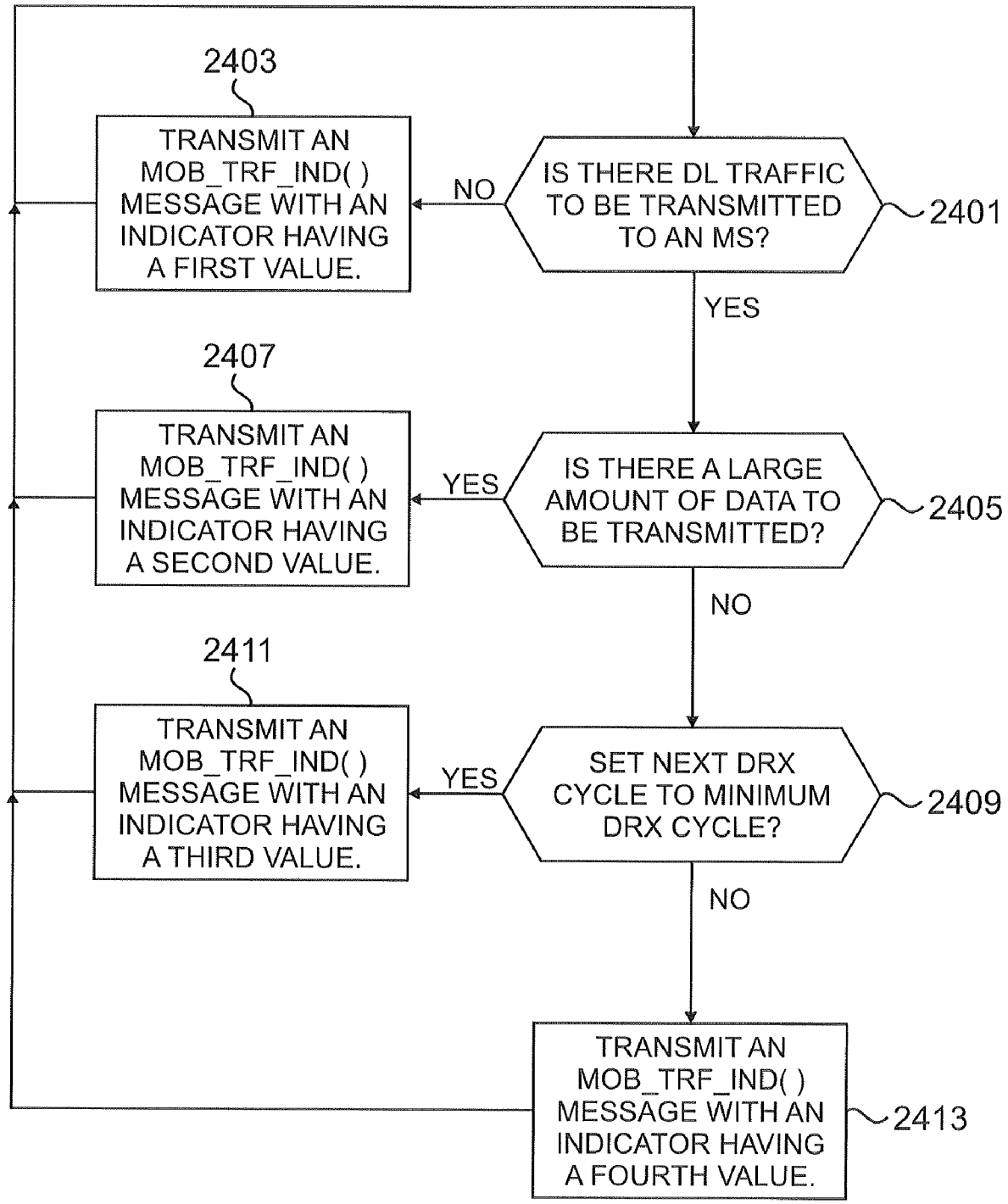
FIG. 24 illustrates a method of operating a base station according to an embodiment of the present disclosure.

FIG. 24 illustrates a method of operating a base station according to an embodiment of the present disclosure.

As shown in FIG. 24, a BS determines if there is DL traffic to be transmitted to an MS at Block 2401. If there is no DL traffic to be transmitted to the MS, the BS transmits an MOB_TRF_IND( ) message with an indicator having a first value at Block 2403 and returns to Block 2401. If there is DL traffic to be transmitted to the MS, the BS determines if there is a large volume of data to be transmitted at Block 2405. If there is a large volume of data to be transmitted, the BS transmits an MOB_TRF_IND( ) message with an indicator having a second value and the large volume of data at Block 2407 and returns to Block 2401. If there is not a large volume of data to be transmitted, the BS determines if the next DRX cycle is to be set to the minimum DRX cycle at Block 2409. If the next DRX cycle is to be set to the minimum DRX cycle, the BS transmits an MOB_TRF_IND( ) message with an indicator having a third value and the data at Block 2411 and returns to Block 2401. If the next DRX cycle is not to be set to the minimum DRX cycle, the BS transmits an MOB_TRF_IND( ) message with an indicator having a fourth value and the data at Block 2413 and returns to Block 2401. The MOB_TRF_IND( ) message with an indicator having the fourth value instructs the MS to set the next DRX cycle equal to the fixed listening interval plus half of the previous DRX cycle minus the fixed listening interval (i.e., next DRX cycle=FLI+½(previous DRX cycle−FLI)).

Figure 25:
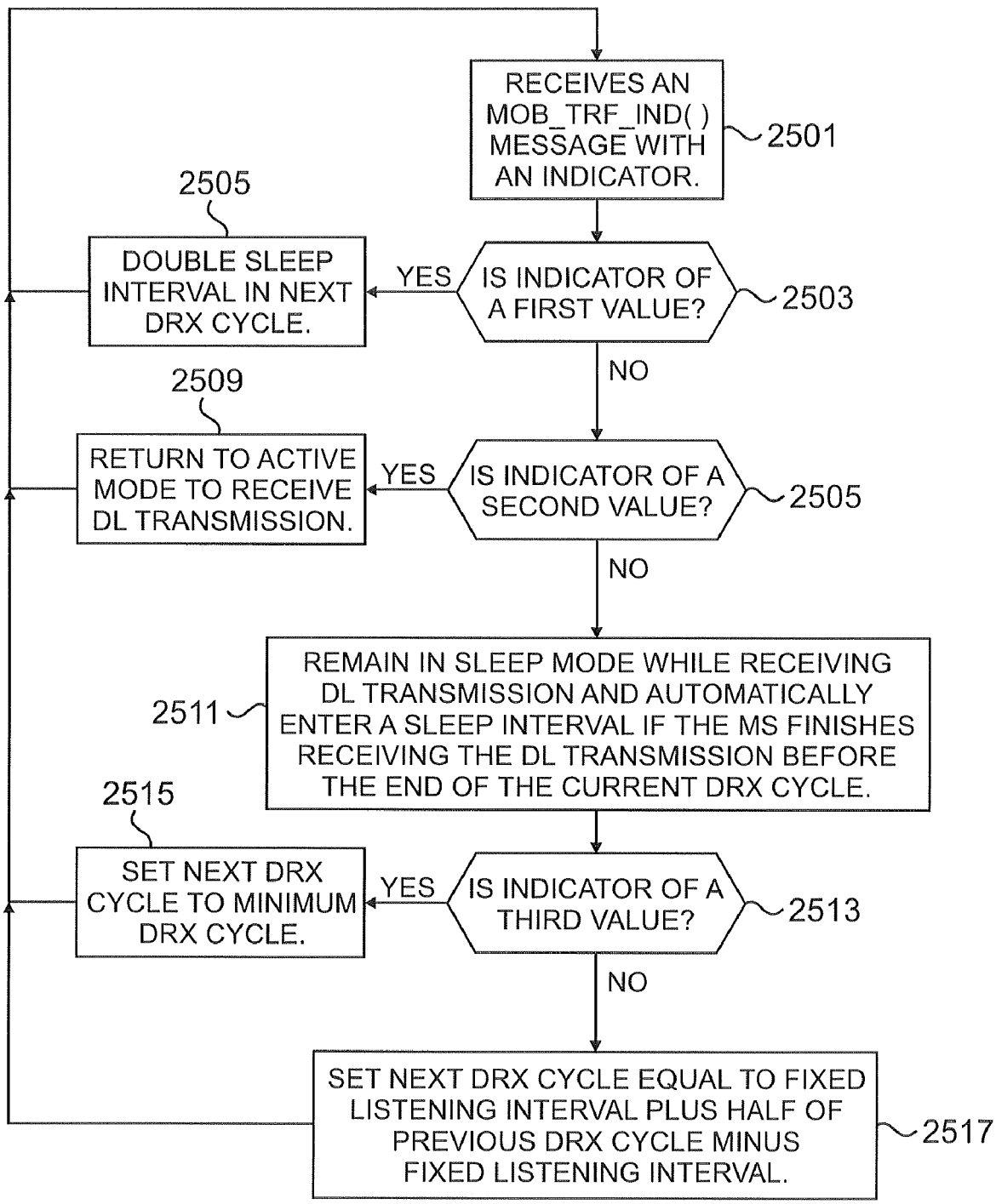
FIG. 25 illustrates a method of operating a mobile station according to an embodiment of the present disclosure.

FIG. 25 illustrates a method of operating a mobile station according to an embodiment of the present disclosure.

As shown in FIG. 25, an MS receives an MOB_TRF_IND( ) message with an indicator at Block 2501. The MS determines if the indicator is of a first value at Block 2503. If the indicator is of a first value, the MS doubles the sleep interval in the next DRX cycle at Block 2505 unless the sleep interval of the previous DRX cycle is already at a predetermined maximum sleep interval and returns to Block 2501. If the indicator is not of a first value, the MS determines if the indicator is of a second value at Block 2507. If the indicator is of the second value, the MS returns to active mode to receive DL transmission at Block 2509 and returns to Block 2501. If the indicator is not of the second value, the MS remains in sleep mode while receiving DL transmission and automatically enters a sleep interval if the MS finishes receiving the DL transmission before the end of the current DRX cycle at Block 2511. At Block 2513, the MS determines if the indicator is of a third value. If the indicator is of the third value, the MS sets the next DRX cycle to the minimum DRX cycle at Block 2515 and returns to Block 2501. If the indicator is not of the third value, the indicator is of a fourth value, and the MS sets the next DRX cycle equal to the fixed listening interval plus half of the previous DRX cycle minus the fixed listening interval (i.e., next DRX cycle=FLI+½(previous DRX cycle−FLI)) at Block 2517 and returns to Block 2501.

Figure 26:
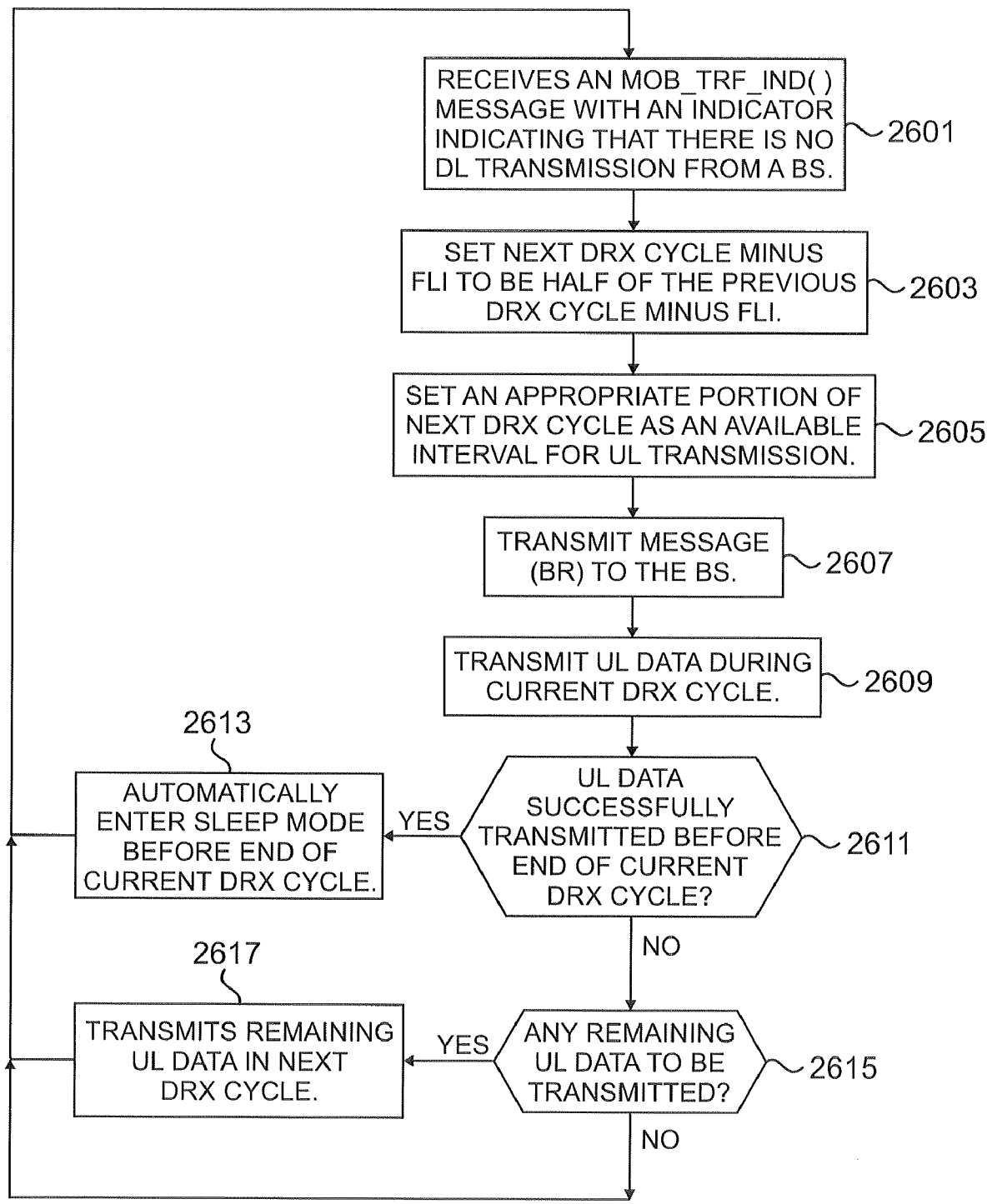
FIG. 26 illustrates a method of operating a mobile station according to another embodiment of the present disclosure.

FIG. 26 illustrates a method of operating a mobile station according to another embodiment of the present disclosure.

As shown in FIG. 26, an MS receives an MOB_TRF_IND( ) message with an indicator indicating that there is no DL transmission from a BS at Block 2601. The MS sets the next DRX cycle minus the FLI to be half of the previous DRX cycle minus the FLI at Block 2603. The MS then sets an appropriate portion of the next DRX cycle as an available interval for UL transmission at Block 2605. At Block 2607, the MS transmits a bandwidth request (BR) message to the BS. The MS then transmits the UL data during the current DRX cycle at Block 2609. At Block 2611, the MS determines if the UL data has been successfully transmitted before the end of the current DRX cycle. If the UL data has been successfully transmitted before the end of the current DRX cycle, the MS automatically enters sleep mode before the end of the current DRX cycle at Block 2613 and returns to Block 2601. At Block 2615, the MS determines if there is any remaining UL data that still needs to be transmitted at the end of the current DRX cycle. If there is remaining UL data to be transmitted, the MS transmits the remaining UL data in the next DRX cycle at Block 2617. If there is no remaining UL data to be transmitted, the MS returns to Block 2601.

Figure 27:
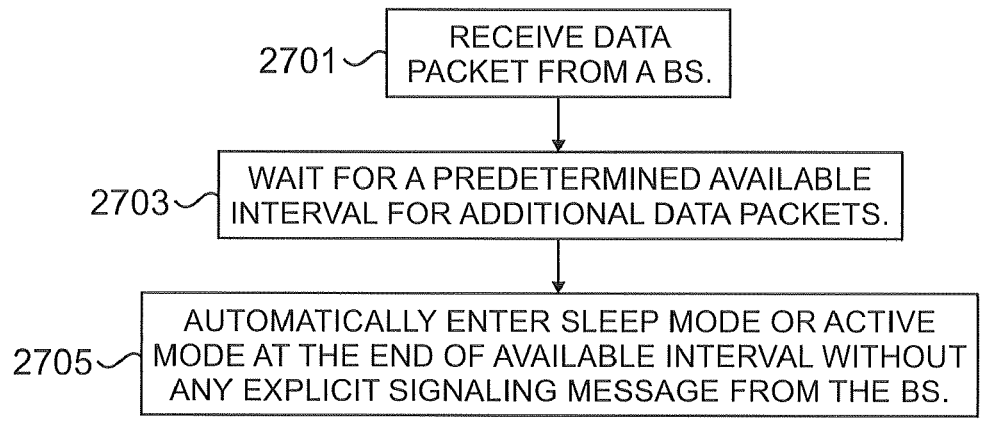
FIG. 27 illustrates a method of operating a mobile station according to yet another embodiment of the present disclosure.

FIG. 27 illustrates a method of operating a mobile station according to yet another embodiment of the present disclosure.

As shown in FIG. 27, an MS receives a data packet from a BS at Block 2701. Upon receiving the data packet, the MS waits for a predetermined available interval for additional data packets at Block 2703. The length of the predetermined available interval can either be negotiated with a BS before the MS enters sleep mode, or the BS can simply inform the MS of the length of the available interval through a certain message at the beginning of a DRX cycle together with a TRF-IND indicator. At Block 2705, the MS either automatically enters sleep mode or active mode at the end of available interval without any explicit signaling message from the BS.

Figure 28:
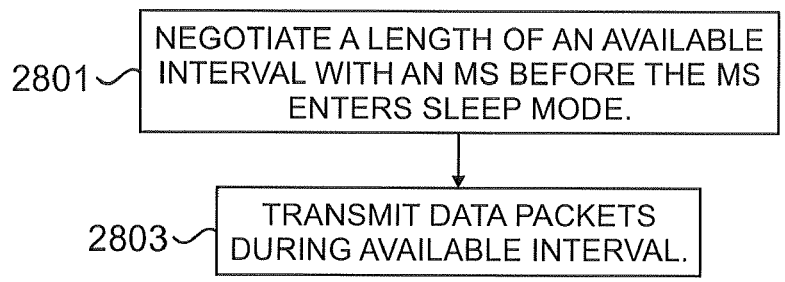
FIG. 28 illustrates a method of operating a base station according to another embodiment of the present disclosure.

FIG. 28 illustrates a method of operating a base station according to another embodiment of the present disclosure.

As shown in FIG. 28, the BS negotiates a length of an available interval with an MS before the MS enters sleep mode at Block 2801. At Block 2803, the BS transmits data packets during the available interval. The MS uses the negotiated available interval length to either automatically enter sleep mode or active mode at the end of available interval without any explicit signaling message from the BS.

Figure 29:
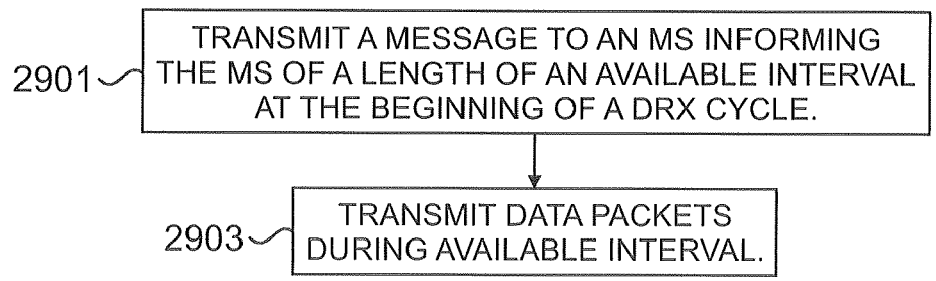
FIG. 29 illustrates a method of operating a base station according to yet another embodiment of the present disclosure.

FIG. 29 illustrates a method of operating a base station according to yet another embodiment of the present disclosure.

As shown in FIG. 29, the BS transmits a message to an MS informing the MS of a length of an available interval at the beginning of a DRX cycle at Block 2901. At Block 2903, the BS transmits data packets during the available interval. The MS uses the provided available interval length to either automatically enter sleep mode or active mode at the end of available interval without any explicit signal from the BS.

Even though this invention does not explicitly describe the situation when the first HARQ transmission fails and retransmissions are carried out, HARQ transmissions or retransmissions will not affect the operation of the methods and systems of the present disclosure. This is because the BS and the MS could adjust the length of AI inside a DRX cycle based on the transmission results.

Accordingly, the time that the communication device is kept in a sleep state may be maximized, particularly in environments where there is light burst traffic, by observing data traffic patterns. Sleep state also may be maximized by allowing a communication device to return to a sleep state after a predetermined time interval without explicit exchange of management messages. In addition, allowing the BS to adjust the sleep periodicity adaptively based upon network conditions can further extend the time that a communication device spends in the sleep state.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station capable of wireless communication with a plurality of subscriber stations within a coverage area of a network, the base station comprising:
    a transmit path circuitry configured to transmit, to a subscriber station, a traffic indication message with an indicator value;
    wherein the indicator value is used by both the base station and the subscriber station to dynamically adjust the length of a next discontinuous reception (DRX) cycle in an absence of an explicit signaling message from the base station, the indicator value comprising a first value when there is no downlink data to be transmitted to the subscriber station, the first value associated with the base station and the subscriber station extending a sleep interval of the next DRX cycle that doubles the length of the previous DRX cycle unless the previous DRX cycle has reached a maximum DRX cycle length.

2. The base station of claim 1, wherein the indicator value comprises a second value when there is downlink data to be transmitted to the subscriber station, the second value causing the subscriber station to receive the downlink data in an active mode.

3. The base station of claim 1, wherein the indicator value comprises a third value when there is downlink data to be transmitted to the subscriber station, the third value causing the subscriber station to:
    remain in sleep mode while receiving the downlink data, and
    set the next DRX cycle to be a minimum DRX cycle.

4. The base station of claim 1, wherein the indicator value comprises a fourth value when there is downlink data to be transmitted to the subscriber station, the fourth value causing the subscriber station to:
    remain in sleep mode while receiving the downlink data, and
    set the next DRX cycle to be a fixed listening interval plus half of a previous DRX cycle minus the fixed listening interval.

5. A method of operating a base station comprising:
    transmitting, from a base station to a subscriber station, a traffic indication message with an indicator value;
    wherein the indicator value is used by both the base station and the subscriber station to dynamically adjust the length of a next discontinuous reception (DRX) cycle in an absence of an explicit signaling message from the base station, the indicator value comprising a first value when there is no downlink data to be transmitted to the subscriber station, the first value associated with the base station and the subscriber station extending a sleep interval of the next DRX cycle that doubles the length of the previous DRX cycle unless the previous DRX cycle has reached a maximum DRX cycle length.

6. The method of claim 5, wherein the indicator value comprises a second value when there is downlink data to be transmitted to the subscriber station, the second value causing the subscriber station to receive the downlink data in an active mode.

7. The method of claim 5, wherein the indicator value comprises a third value when there is downlink data to be transmitted to the subscriber station, the third value causing the subscriber station to:
    remain in sleep mode while receiving the downlink data, and
    set the next DRX cycle to be a minimum DRX cycle.

8. The method of claim 5, wherein the indicator value comprises a fourth value when there is downlink data to be transmitted to the subscriber station, the fourth value causing the subscriber station to:
    remain in sleep mode while receiving the downlink data, and
    set the next DRX cycle to be a fixed listening interval plus half of a previous DRX cycle minus the fixed listening interval.

9. A mobile station comprising:
a receive path circuitry configured to receive, from a base station, a traffic indication message with an indicator value;
wherein the indicator value is used by both the base station and the mobile station to dynamically adjust the length of a next discontinuous reception (DRX) cycle in an absence of an explicit signaling message from the base station,
wherein if the indicator value comprises a first value, the mobile station is configured to automatically extend a sleep interval in a next discontinuous reception (DRX) cycle that doubles the length of the previous DRX cycle unless the previous DRX cycle has reached a maximum DRX cycle length in an absence of an explicit signaling message from the base station.

10. The mobile station of claim 9, wherein if the indicator value comprises a second value, the mobile station automatically returns to active mode in an absence of an explicit signaling message from the base station.

11. The mobile station of claim 9, wherein if the indicator value comprises a third value, the mobile station remains in sleep mode while receiving downlink data, and automatically sets a next discontinuous reception (DRX) cycle to be a minimum DRX cycle in an absence of an explicit signaling message from the base station.

12. The mobile station of claim 9, wherein if the indicator value comprises a fourth value, the mobile station remains in sleep mode while receiving downlink data, and automatically sets a next discontinuous reception (DRX) cycle to be a fixed listening interval plus half of a previous DRX cycle minus the fixed listening interval in an absence of an explicit signaling message from the base station.

13. A mobile station comprising:
a controller configured, upon receiving, from a base station, a traffic indication message with an indicator indicating that there is no downlink transmission for the mobile station, to:
set a next discontinuous reception (DRX) cycle minus a fixed listening interval (FLI) to be half of a previous DRX cycle minus the fixed listening interval (FLI); and
set an appropriate portion of the next DRX cycle as an available interval for uplink transmission;
wherein the controller sets the next DRX cycle and an appropriate portion of the next DRX cycle as an available interval for uplink transmission in an absence of an explicit signaling message from the base station.

14. The mobile station of claim 13 further comprising:
a transmit path circuitry configured to transmit uplink data during a current DRX cycle.

15. The mobile station of claim 14 wherein if the uplink data is successfully transmitted before the end of the current DRX cycle, the mobile station automatically enters a sleep mode before the end of the current DRX cycle in an absence of an explicit signaling message from the base station.

16. The mobile station of claim 14 wherein, if there is remaining uplink data that has not been transmitted at the end of the current DRX cycle, the transmit path circuitry transmits the remaining uplink data in the next DRX cycle in an absence of an explicit signaling message from the base station.

17. A mobile station comprising:
a controller configured, in response to detecting that a traffic indication message from a base station was lost during a listening interval, to:
mark a current time as fail time,
automatically reset a current pseudo sleep interval (PSI) to a minimum pseudo sleep interval, and
attempt a number of re-trials during a number of consecutive discontinuous reception (DRX) cycles implementing the minimum pseudo sleep interval;
wherein the current pseudo sleep interval is reset to the minimum pseudo sleep interval in an absence of an explicit signaling message from the base station.

18. The mobile station of claim 17, wherein if the re-trials up to a last re-trial fail, the mobile station attempts the last re-trial with the pseudo sleep interval beginning from the fail time set to twice the length of the pseudo sleep interval prior to the fail time; and
wherein re-synchronization with the base station is achieved at the last re-trial.

19. The mobile station of claim 18, wherein in response to a failure of the last re-trial, the mobile station automatically returns to an awake mode in an absence of an explicit signaling message from the base station.

20. The mobile station of claim 17, wherein in response to receiving a traffic indication message having a first value during the re-trials, the mobile station implements a pseudo sleep interval beginning from the fail time that is twice as long as the pseudo sleep interval prior to fail time; and
wherein re-synchronization with the base station is achieved at a next fixed listening interval after the pseudo sleep interval that is twice as long as the pseudo sleep interval prior to fail time.

21. The mobile station of claim 17, wherein in response to receiving a downlink map message without a traffic indication message having a first value during the re-trials, the mobile station implements a pseudo sleep interval beginning from the fail time that is twice as long as the pseudo sleep interval prior to fail time; and
wherein re-synchronization with the base station is achieved at a next fixed listening interval after the pseudo sleep interval that is twice as long as the pseudo sleep interval prior to fail time.

22. A mobile station comprising:
a controller configured, in response to detecting that a traffic indication message from a base station was lost during a listening interval, to automatically reset a current pseudo sleep interval (PSI) to a minimum pseudo sleep interval;
wherein the current pseudo sleep interval is reset to the minimum pseudo sleep interval in an absence of an explicit signaling message from the base station;
wherein the current pseudo sleep interval is reset at the base station to the minimum pseudo sleep interval; and
wherein re-synchronization with the base station is achieved at a next discontinuous reception (DRX) cycle.

23. A mobile station comprising:
a transmit path circuitry configured, in response to receiving a traffic indication message indicating that there is downlink data ready for transmission from a base station, to:
transmit an acknowledgment message, and
automatically reset a current pseudo sleep interval (PSI) to a minimum pseudo sleep interval;
wherein the transmit path circuitry automatically resets the current pseudo sleep interval to the minimum pseudo sleep interval in an absence of an explicit signaling message from the base station;
wherein the current pseudo sleep interval is automatically reset to the minimum pseudo sleep interval at the base station when the acknowledgment message is not received; and wherein re-synchronization with the base station is achieved at a next discontinuous reception (DRX) cycle.

24. A mobile station comprising:
a transmit path circuitry configured, in response to receiving a traffic indication message indicating that there is no downlink data ready for transmission from a base station, to:
  transmit a bandwidth request message,
  automatically reset a current pseudo sleep interval (PSI) to a minimum pseudo sleep interval; and
  attempt a number of re-trials during a number of consecutive discontinuous reception (DRX) cycles implementing the minimum pseudo sleep interval;
wherein the current pseudo sleep interval is reset to the minimum pseudo sleep interval in an absence of an explicit signaling message from the base station.

25. The mobile station of claim 24, wherein if the re-trials up to a last re-trial fail, the mobile station attempts the last re-trial with the pseudo sleep interval beginning from the fail time set to twice the length of the pseudo sleep interval prior to the fail time; and
  wherein re-synchronization with the base station is achieved at the last re-trial.

26. A mobile station comprising:
a transmit path circuitry configured, in response to receiving a traffic indication message indicating that there is no downlink data ready for transmission from a base station, to:
  transmit a bandwidth request message, and
  automatically reset a current pseudo sleep interval (PSI) to a minimum pseudo sleep interval;
wherein the transmit path circuitry automatically resets the current pseudo sleep interval to the minimum pseudo sleep interval in an absence of an explicit signaling message from the base station;
wherein the current pseudo sleep interval is reset to the minimum pseudo sleep interval at the base station upon transmission of an uplink resource allocation message; and
wherein re-synchronization with the base station is achieved at a next discontinuous reception (DRX) cycle.

27. A base station capable of wireless communication with a plurality of mobile stations within a coverage area of a network, the base station comprising:
a transmit path circuitry configured to:
  transmit a traffic indication message with downlink traffic data to a mobile station; and
  if the base station does not receive an acknowledgment message from the mobile station in response to the traffic indication message:
    automatically reset a current pseudo sleep interval (PSI) to a minimum pseudo sleep interval, and
    re-transmit the traffic indication message and the downlink traffic data to the mobile station at a next discontinuous reception (DRX) cycle with the pseudo sleep interval set to the minimum pseudo sleep interval.

28. The base station of claim 27, wherein if the base station fails to receive feedback from the mobile station after re-transmitting over a number of consecutive DRX cycles with the pseudo sleep interval set to the minimum pseudo sleep interval, the base station attempts the last re-transmission with the pseudo sleep interval beginning from the fail time set to twice the length of the pseudo sleep interval prior to the fail time.

29. The base station of claim 28, wherein an absence of an explicit signaling message from the base station causes the mobile station to automatically return to a normal mode after the last re-transmission.

30. A method of operating a base station comprising:
transmitting a traffic indication message with downlink traffic data to a mobile station; and
if the base station does not receive an acknowledgment message from the mobile station in response to the traffic indication message:
  automatically resetting a current pseudo sleep interval (PSI) to a minimum pseudo sleep interval, and
  re-transmitting the traffic indication message and the downlink traffic data to the mobile station at a next discontinuous reception (DRX) cycle with the pseudo sleep interval set to the minimum pseudo sleep interval.

31. The method of claim 30, wherein if the base station fails to receive feedback from the mobile station after re-transmitting over a number of consecutive DRX cycles with the pseudo sleep interval set to the minimum pseudo sleep interval, the base station attempts the last re-transmission with the pseudo sleep interval beginning from the fail time set to twice the length of the pseudo sleep interval prior to the fail time.

32. The method of claim 31, wherein an absence of an explicit signaling message from the base station causes the mobile station automatically to return to a normal mode after the last re-transmission.

33. A base station capable of wireless communication with a plurality of mobile stations within a coverage area of a network, the base station comprising:
a transmit path circuitry configured to:
  transmit a traffic indication message indicating that there is no downlink data ready for transmission to a mobile station; and
  automatically increase a current pseudo sleep interval (PSI) to twice the length of the previous pseudo sleep interval;
wherein the traffic indication message being lost causes the mobile station to note a fail time and automatically use a pseudo sleep interval that is twice the length of the pseudo sleep interval prior to the fail time in an absence of an explicit signaling message from the base station.

34. The base station of claim 33, wherein the mobile station implements a pseudo sleep interval that is twice the length of the pseudo sleep interval prior to the fail time after attempting a number of re-trials during a number of consecutive discontinuous reception (DRX) cycles implementing a minimum pseudo sleep interval.

35. The base station of claim 33, wherein re-synchronization with the mobile station is achieved at a next fixed listening interval that is twice as long as the pseudo sleep interval prior to fail time.

36. A method of operating a base station comprising:
transmitting a traffic indication message indicating that there is no downlink data ready for transmission to a mobile station; and
automatically increasing a current pseudo sleep interval (PSI) to twice the length of the previous pseudo sleep interval;
wherein the traffic indication message being lost causes the mobile station to note a fail time and automatically use a pseudo sleep interval that is twice the length of the pseudo sleep interval prior to the fail time in an absence of an explicit signaling message from the base station.

37. The method of claim 36, wherein the mobile station implements a pseudo sleep interval that is twice the length of the pseudo sleep interval prior to the fail time after attempting a number of re-trials during a number of consecutive discontinuous reception (DRX) cycles implementing a minimum pseudo sleep interval.

38. A base station capable of wireless communication with a plurality of mobile stations within a coverage area of a network, the base station comprising:
a transmit path circuitry configured to:
transmit a traffic indication message indicating that there is no downlink data ready for transmission to a mobile station; and
automatically increase a current pseudo sleep interval (PSI) to twice the length of the previous pseudo sleep interval;
wherein the traffic indication message being lost causes the mobile station to automatically attempt a last re-trial with the pseudo sleep interval beginning from a fail time set to twice the length of the pseudo sleep interval prior to the fail time in an absence of an explicit signaling message from the base station.

39. A method of operating a base station comprising:
transmitting a traffic indication message indicating that there is no downlink data ready for transmission to a mobile station; and
automatically increasing a current pseudo sleep interval (PSI) to twice the length of the previous pseudo sleep interval;
wherein the traffic indication message being lost causes the mobile station to automatically attempt a last re-trial with the pseudo sleep interval beginning from a fail time set to twice the length of the pseudo sleep interval prior to the fail time in an absence of an explicit signaling message from the base station.

40. A base station capable of wireless communication with a plurality of mobile stations within a coverage area of a network, the base station comprising:
a transmit path circuitry configured to:
transmit a traffic indication message indicating that there is downlink data ready for transmission to a mobile station; and
automatically reset a current pseudo sleep interval (PSI) to a minimum pseudo sleep interval;
wherein the traffic indication message causes the mobile station to automatically reset the current pseudo sleep interval to the minimum pseudo sleep interval in an absence of an explicit signaling message from the base station.

41. A method of operating a base station comprising:
transmitting a traffic indication message indicating that there is downlink data ready for transmission to a mobile station; and
automatically resetting a current pseudo sleep interval (PSI) to a minimum pseudo sleep interval;
wherein the traffic indication message causes the mobile station to automatically reset the current pseudo sleep interval to the minimum pseudo sleep interval in an absence of an explicit signaling message from the base station.

42. A base station capable of wireless communication with a plurality of mobile stations within a coverage area of a network, the base station comprising:
a transmit path circuitry configured to:
transmit a traffic indication message indicating that there is no downlink data ready for transmission to a mobile station; and
automatically increase a current pseudo sleep interval (PSI) to twice the length of the previous pseudo sleep interval;
wherein the pseudo sleep interval is used by the mobile station to automatically attempt a last re-trial beginning from a fail time set to twice the length of the pseudo sleep interval prior to the fail time in an absence of an explicit signaling message from the base station even when a bandwidth request message from the mobile station is lost.

43. The base station of claim 42, wherein the mobile station implements the pseudo sleep interval that is twice the length of the pseudo sleep interval prior to the fail time after attempting a number of re-trials during a number of consecutive discontinuous reception (DRX) cycles implementing a minimum pseudo sleep interval.

44. A method of operating a base station comprising:
transmitting a traffic indication message indicating that there is no downlink data ready for transmission to a mobile station; and
automatically increasing a current pseudo sleep interval (PSI) to twice the length of the previous pseudo sleep interval;
wherein the pseudo sleep interval is used by the mobile station to automatically attempt a last re-trial beginning from a fail time set to twice the length of the pseudo sleep interval prior to the fail time in an absence of an explicit signaling message from the base station even when a bandwidth request message from the mobile station is lost.

45. The method of claim 44, wherein the mobile station implements the pseudo sleep interval that is twice the length of the pseudo sleep interval prior to the fail time after attempting a number of re-trials during a number of consecutive discontinuous reception (DRX) cycles implementing a minimum pseudo sleep interval.

46. A base station capable of wireless communication with a plurality of mobile stations within a coverage area of a network, the base station comprising:
a receive path circuitry configured to:
receive a bandwidth request message from a mobile station; and
automatically resetting a current pseudo sleep interval (PSI) to a minimum pseudo sleep interval;
wherein receipt of the bandwidth request message causes the mobile station to automatically reset the current pseudo sleep interval to the minimum pseudo sleep interval in an absence of an explicit signaling message from the base station.

47. A method of operating a base station comprising:
receiving a bandwidth request message from a mobile station; and
automatically resetting a current pseudo sleep interval (PSI) to a minimum pseudo sleep interval;
wherein upon transmitting the bandwidth request message, the mobile station automatically resets the current pseudo sleep interval to the minimum pseudo sleep interval in an absence of an explicit signaling message from the base station.

* * * * *